United States Patent
Kim et al.

(10) Patent No.: US 10,788,324 B2
(45) Date of Patent: Sep. 29, 2020

(54) METHOD AND APPARATUS FOR CALCULATION OF ANGULAR VELOCITY USING ACCELERATION SENSOR AND GEOMAGNETIC SENSOR

(71) Applicant: Haechitech Corporation, Cheongju-si (KR)

(72) Inventors: Dong Yoon Kim, Ithaca, NY (US); Seong Min Choe, Seongnam-si (KR)

(73) Assignee: Haechitech Corporation, Cheongju-si (KR)

( * ) Notice: Subject to any disclaimer, the term of this patent is extended or adjusted under 35 U.S.C. 154(b) by 267 days.

(21) Appl. No.: 15/984,923

(22) Filed: May 21, 2018

(65) Prior Publication Data
US 2018/0356227 A1 Dec. 13, 2018

(30) Foreign Application Priority Data
Jun. 8, 2017 (KR) .......................... 10-2017-0071721

(51) Int. Cl.
G05B 19/408 (2006.01)
G05B 19/401 (2006.01)
G01C 19/5776 (2012.01)

(52) U.S. Cl.
CPC ....... *G01C 19/5776* (2013.01); *G05B 19/401* (2013.01); *G05B 19/4086* (2013.01); *G05B 2219/37024* (2013.01); *G05B 2219/37124* (2013.01); *G05B 2219/37388* (2013.01)

(58) Field of Classification Search
CPC .............. G01C 19/5776; G05B 19/401; G05B 19/4086; G05B 2219/37024; G05B 2219/37124; G05B 2219/37388
See application file for complete search history.

(56) References Cited

U.S. PATENT DOCUMENTS 6,647,352 B1 * 11/2003 Horton ................... G01C 21/16
702/151
6,863,244 B2 * 3/2005 Fowell ................... B64G 1/361
244/158.1
9,846,040 B2 * 12/2017 Hallberg .............. G01C 21/165
(Continued)

FOREIGN PATENT DOCUMENTS

KR 10-2016-0133259 A 11/2016

*Primary Examiner* — David A. Rogers
(74) *Attorney, Agent, or Firm* — NSIP Law

(57) ABSTRACT

A processor-implemented method based on an acceleration sensor and a geomagnetic sensor for determining an angular velocity of an object includes: deriving a state variable and a variance of the state variable based on an error quaternion and converting a quaternion-based rotation matrix into an error quaternion-based rotation matrix; calculating an observation matrix and an output matrix of the Kalman filter based on the error quaternion-based rotation matrix; calculating a gain of the Kalman filter based on the transferred variance of the state variable and the observation matrix of the Kalman filter after transferring the state variable and the variance of the state variable through a discretized transfer matrix; calculating a quaternion-based on a calibrated state variable and an estimated quaternion after calibrating the state variable and the variance of the state variable through the gain of the Kalman filter; and calculating angular velocity based on the quaternion.

27 Claims, 8 Drawing Sheets

(56) References Cited

U.S. PATENT DOCUMENTS

| | | | |
|---|---|---|---|
| 2008/0265097 A1* | 10/2008 | Stecko | B64D 39/00 244/135 A |
| 2010/0138180 A1* | 6/2010 | Sugihara | B25J 9/163 702/94 |
| 2010/0250020 A1* | 9/2010 | Lee | G01S 15/931 700/302 |
| 2014/0288873 A1* | 9/2014 | Czompo | G01C 19/5776 702/141 |
| 2016/0240168 A1* | 8/2016 | Keal | G06F 3/002 |
| 2016/0327396 A1* | 11/2016 | Hallberg | G01C 21/165 |
| 2017/0191831 A1* | 7/2017 | Karahan | G01P 15/00 |
| 2017/0191835 A1* | 7/2017 | Ou | G04C 3/002 |
| 2017/0299388 A9* | 10/2017 | Karahan | G01C 25/005 |
| 2018/0299293 A1* | 10/2018 | Ell | G01C 21/16 |

\* cited by examiner

METHOD AND APPARATUS FOR CALCULATION OF ANGULAR VELOCITY USING ACCELERATION SENSOR AND GEOMAGNETIC SENSOR

CROSS-REFERENCE TO RELATED APPLICATIONS

This application claims under 35 USC 119(a) of Korean Patent Application No. 10-2017-0071721 filed on Jun. 8, 2017, in the Korean Intellectual Property Office, the entire disclosure of which is incorporated herein by reference for all purposes.

BACKGROUND

1. Field

The present disclosure relates to a method and an apparatus for calculating angular velocity, and more particularly, to a method and an apparatus for calculating angular velocity using measurement values of an acceleration sensor and a geomagnetic sensor.

2. Description of the Related Art

Angular velocity information is utilized in various fields in which motion information of an object in motion is required. Angular velocity (or rotational angular velocity) is used to calculate a traveling direction and a rotating direction required for navigational systems used in vehicles, e.g., automobiles, marine vessels, etc. Angular velocity may be used to determine and control a traveling direction and orientation of aerial vehicles or autonomous vehicles that are now becoming ubiquitous. Angular velocity calculations may also be utilized in a game controller of a game machine or a direction input device of a user in an augmented reality field, and further utilized to control angular positions and recognize motion in a field of a game compass using a mobile phone as an input device. The tendency to require angular velocity information as described above is ever increasing.

An angular velocity calculating device is used to measure rotation angle information and position information when an object moves in a space. To this end, a physical gyro sensor which acquires rotational acceleration may be used.

The gyro sensor may use various principles to calculate angular velocity information, but mainly uses Coriolis force. When an object rotates and travels, the Coriolis force is generated at a direction of 90° with respect to the traveling direction and is generated only by the rotation. Generally, since it is not easy to directly measure the angular velocity, the Coriolis force is measured first and then converted to measure the angular velocity.

However, in order to implement the measuring principle, a detecting structure needs to be rotated or vibrated in the sensor, which becomes an obstacle to minimize the sensor. Such characteristics also cause the same problems in a micro-electro mechanical system MEMS gyro sensor. Most MEMS gyro sensors use a tuning fork method, a vibration wheel method, a Foucault pendulum method, or a wine glass tuning method, which also need to include a detecting structure which does not stop, but moves in the sensor.

Further, since a structure that maintains a state of motion in a relatively small space is required by the sensor, there is a limit to miniaturizing the device, which results in an increase in the level of difficulty of design, cost and manufacturing. In order to maintain the detecting structure in a motion state, the detecting structure needs to be electrically excited. Therefore, power consumption of the gyro sensor is relatively higher than that of other sensors. In this case, an internal temperature of the sensor is also increased due to the consumed current, which damages electrical stability. Further, the internal structure is complicated so that the sensor is vulnerable to a mechanical impact.

Even though the gyro sensor outputs angular velocity due to its characteristic, in fact, in various applications, an angle is more frequently used than the angular velocity. In order to convert the angular velocity into angle information, an integration process needs to be performed. However, the integration process causes mathematical instability to generate mathematical saturation and cause an erroneous operation thereby. All sensors inevitably include offsets and the gyro sensor is not exceptional and allows offsets as specified in a product specification. Even though the offset is small, the saturation phenomenon cannot be avoided unless the offset value is periodically reset as a sufficient time passes. This characteristic also limits the application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method based on an acceleration sensor and a geomagnetic sensor for determining an angular velocity of an object includes: deriving a state variable and a variance of the state variable based on an error quaternion and converting a quaternion-based rotation matrix into an error quaternion-based rotation matrix; calculating an observation matrix and an output matrix of the Kalman filter after redefining an output of an acceleration sensor and an output of a geomagnetic sensor using the error quaternion-based rotation matrix; calculating a gain of the Kalman filter based on the transferred variance of the state variable and the observation matrix of the Kalman filter after transferring the state variable and the variance of the state variable through a discretized transfer matrix; calculating a quaternion-based on a calibrated state variable and an estimated quaternion after calibrating the state variable and the variance of the state variable through the gain of the Kalman filter; and calculating the angular velocity based on the quaternion.

In the converting of a quaternion-based rotation matrix into an error quaternion-based rotation matrix, an error quaternion $[q_{ex}, q_{ey}, q_{ez}]'$ of a quaternion $q=[q_0, q_x, q_y, q_z]'$ which expresses a relative angle change between a reference coordinate system and a sensor coordinate system may be set to a state variable x.

In the converting of a quaternion-based rotation matrix into an error quaternion-based rotation matrix, when a current state and a previous state have a statistic correlation in which only time delay $\tau$ is generated, the state variable x may be expressed by an equation of $\dot{x}=Fx$, where F is a transfer matrix expressed by $$F = -\frac{1}{\tau}\begin{bmatrix} 1 & 0 & 0 \\ 0 & 1 & 0 \\ 0 & 0 & 1 \end{bmatrix},$$

and τ is a time factor representing an associated degree between the states.

In the converting of a quaternion-based rotation matrix into an error quaternion-based rotation matrix, a variance of the state variable may be calculated by an equation of $\hat{P}(t)=E\{(x(t)-\hat{x}(t))(x(t)-\hat{x}(t))'\}$, where x is a state variable, $\hat{x}$ is an estimated state variable, and ' is a transpose matrix.

In the converting of a quaternion-based rotation matrix into an error quaternion-based rotation matrix, the quaternion-based rotation matrix may be converted into the error quaternion-rotation matrix based on an equation of $C(q)=C(q_e)C(\hat{q})$, the quaternion-based rotation matrix is $$C(q) = \begin{bmatrix} 2q_0^2 + 2q_x^2 - 1 & 2q_xq_y + 2q_0q_z & 2q_xq_z - 2q_0q_y \\ 2q_xq_y - 2q_0q_z & 2q_0^2 + 2q_y^2 - 1 & 2q_yq_z + 2q_0q_x \\ 2q_xq_z + 2q_0q_y & 2q_yq_z - 2q_0q_x & 2q_0^2 + 2q_z^2 - 1 \end{bmatrix},$$

the error quaternion-based rotation matrix is $$C(q_e) \approx \begin{bmatrix} 1 & 2q_{ez} & -2q_{ey} \\ -2q_{ez} & 1 & 2q_{ex} \\ 2q_{ey} & -2q_{ex} & 1 \end{bmatrix} = I_{3\times 3} - 2q_3 \times,$$

where $q_{ex}$, $q_{ey}$, $q_{ez}$ are vector component factors of the error quaternion, $q_e x$ represents $$\begin{bmatrix} 0 & -q_{ez} & q_{ey} \\ q_{ez} & 0 & -q_{ex} \\ -q_{ey} & q_{ex} & 0 \end{bmatrix},$$

and $q_0$ is a factor corresponding to $$\cos\left(\frac{\theta}{2}\right)$$

scalar in the quaternion.

In the converting of a quaternion-based rotation matrix into an error quaternion-based rotation matrix, when $q_{ex}$, $q_{ey}$, and $q_{ez}$ are minute amounts, the error quaternion based rotation matrix expressed by $$C(q_e) = \begin{bmatrix} 1 + 2q_{ex}^2 & 2q_{ex}q_{ey} + 2q_{ez} & 2q_{ex}q_{ez} - 2q_{ey} \\ 2q_{ex}q_{ey} - 2q_{ez} & 1 + 2q_{ey}^2 & 2q_{ey}q_{ez} + 2q_{ex} \\ 2q_{ex}q_{ez} + 2q_{ey} & 2q_{ey}q_{ez} - 2q_{ex} & 1 + 2q_{ez}^2 \end{bmatrix}$$

and may be simplified into $$C(q_e) \approx \begin{bmatrix} 1 & 2q_{ez} & -2q_{ey} \\ -2q_{ez} & 1 & 2q_{ex} \\ 2q_{ey} & -2q_{ex} & 1 \end{bmatrix} = I_{3\times 3} - 2q_e \times.$$

In the calculating of an observation matrix and an output matrix of the Kalman filter, an acceleration sensor output $Y_a$ and an output $Y_m$ of the geomagnetic sensor may be redefined based on a correlation between the error quaternion $q_e$ expressed by $C(q)=C(q_e)C(\hat{q})=(I-2q_e x)C(\hat{q})$ and the quaternion-based rotation matrix $C(q)$, the acceleration sensor output $Y_a$ is $Y_a-C(\hat{q})\vec{G}=2C(\hat{q})\vec{G}q_e+B_a+V_a$, the output $Y_m$ of the geomagnetic sensor is $Y_m-C(\hat{q})\vec{M}=2C(\hat{q})\vec{M}q_e+V_m$, where $C(\hat{q})$ is an estimated quaternion-based rotation matrix, $I_{3\times 3}$ is a 3×3 unit matrix, $\vec{G}$ is a gravitational acceleration vector, $B_a$ is a linear acceleration, $V_a$ is a noise of the acceleration sensor, $\vec{M}$ is an earth geomagnetic vector, and $V_m$ is a noise of the geomagnetic sensor.

In the calculating of an observation matrix and an output matrix of the Kalman filter, based on the acceleration sensor output $Y_a$ and the output $Y_m$ of the geomagnetic sensor, an observation matrix of the Kalman filter of $$H = \begin{bmatrix} 2C(\hat{q})\vec{G}q_e \\ 2C(\hat{q})\vec{M}q_e \end{bmatrix}$$

may be calculated and an output matrix of the Kalman filter of $$Z = \begin{bmatrix} Y_a - C(\hat{q})\vec{G} \\ Y_m - C(\hat{q})\vec{M} \end{bmatrix}$$

may be calculated.

In the calculating of a gain of the Kalman filter, the state variable x may be transferred according to an equation of $\hat{x}_{k+1}=F_k\hat{x}_k$ and a variance p of the state variable may be transferred according to an equation of $\hat{P}_{k+1}=F_k\hat{P}_kF'_k+Qd_k$, where $F_k$ is a discretized transfer matrix expressed by an equation of $F_k \approx I+F(kT)T+\frac{1}{2}F(kT)^2T^2$, $Qd_k$ is a discretized process noise variance of Q expressed by an equation of $Qd_k \approx QT+\frac{1}{2}F(kT)+\frac{1}{2}F(kT)'$, and T is a sampling time.

In the calculating of a gain of the Kalman filter, the discretized transfer matrix expressed by an equation of $$F_k = e^{F*T} = e^{-\frac{T}{\tau}\begin{bmatrix} 1 & 0 & 0 \\ 0 & 1 & 0 \\ 0 & 0 & 1 \end{bmatrix}}$$

may be assumed to be a first-order linear formula to be simplified into $F_k \approx I+F(kT)T+\frac{1}{2}F(kT)^2T^2$, F is a transfer matrix expressed by $$F = -\frac{1}{\tau}\begin{bmatrix} 1 & 0 & 0 \\ 0 & 1 & 0 \\ 0 & 0 & 1 \end{bmatrix},$$

and τ is a time factor which represents an associated degree between states.

In the calculating of a gain of the Kalman filter, the gain of the Kalman filter may be calculated according to an equation of $K_k=P_kH'_k(H_kP_kH'_k+R)^{-1}$, where R is a variance of a measurement sensor error and is expressed by an equation of $$R = \begin{bmatrix} R_a I_{3\times 3} & 0_{3\times 3} \\ 0_{3\times 3} & R_m I_{3\times 3} \end{bmatrix},$$

$I_{3\times 3}$ is a 3×3 unit matrix, $0_{3\times 3}$ is a 3×3 0 matrix, $R_a$ is a variance of the acceleration sensor, and $R_m$ is a variance of the geomagnetic sensor.

In the calculating of a quaternion, the state variable may be calibrated according to an equation of $x_k = \hat{x}_k + K_k(Z_k - H_k\hat{x}_k)$ and a variance of the state variable may be calibrated according to an equation of $P_k = (I - K_k H_k)\hat{P}_k(I - K_k H_k)' + K_k R K'_k$, where $K_k$ is a gain of the Kalman filter, $Z_k$ is an output matrix of the Kalman filter, $H_k$ is an observation matrix of the Kalman filter, I is a 3×3 unit matrix, and R is a variance of a measurement sensor error.

In the calculating of a quaternion, after setting the calibrated state variable to be an error quaternion, the quaternion may be calculated according to an equation of $q_k = \hat{q}_k \otimes [1 \; q_{ex} \; q_{ey} \; q_{ez}]'_k$, $\hat{q}_k$ is an estimated quaternion and are $q_{ex}$, $q_{ey}$, $q_{ez}$ are three- factor variables of the error quaternion.

In the calculating of angular velocity based on the quaternion, after acquiring a differential expression expressed by an equation of $$\frac{dq(t)}{dt} = \frac{1}{2}W(t)q(t)$$

by differentiating the quaternion, the differential expression may be arranged for every factor and then discretized to acquire an angular velocity calculating equation expressed by an equation of $$\begin{bmatrix} \omega_x^k \\ \omega_y^k \\ \omega_z^k \end{bmatrix} = 2/T \begin{bmatrix} q_0^k - q_0^{k-1} \\ q_x^k - q_x^{k-1} \\ q_y^k - q_y^{k-1} \\ q_z^k - q_z^{k-1} \end{bmatrix} \begin{bmatrix} -q_x^k & q_0^k & q_z^k & q_y^k \\ -q_y^k & -q_z^k & q_0^k & q_x^k \\ -q_z^k & q_y^k & -q_x^k & q_0^k \end{bmatrix},$$

where W(t) is an angular velocity vector expressed by an equation of $W(t) = [0 \; \omega_x \; \omega_y \; \omega_z]'$, $q_0$, $q_x$, $q_y$, and $q_z$ are four factors which configure the quaternion, and T is a sampling time.

In the calculating of angular velocity based on the quaternion, the differential expression may be arranged for every factor to derive and arrange equations of $$"\frac{dq_0}{dt} = -\frac{1}{2}(\omega_x q_x + \omega_y q_y + \omega_z q_z)",$$

$$"\frac{dq_x}{dt} = \frac{1}{2}(\omega_x q_0 + \omega_y q_z - \omega_z q_y)",$$

$$"\frac{dq_y}{dt} = \frac{1}{2}(\omega_y q_0 + \omega_z q_x - \omega_z q_z)",$$

$$"\frac{dq_z}{dt} = -\frac{1}{2}(\omega_z q_0 + \omega_x q_y - \omega_x q_z)"$$

to generate an equation for calculating an angular velocity vector expressed by an equation of $$W(t) = 2\frac{dq(t)}{dt}q(t)^{-1}$$

and then discretize the equation for calculating an angular velocity vector to acquire the angular velocity calculating equation, and $q^{-1}$ is expressed by an equation of $q^{-1} = [q_0 \; -q_x \; -q_y \; -q_z]'$.

The method may further include calculating an Euler angle by rotating the Euler angle in the order of a z axis, a y axis, and an x axis in the quaternion, in which the Euler angle is calculated based on at least one equation of $\text{Roll} = \tan^{-1}(2(q_0 q_x + q_y q_z), \; 1 - 2(q_x^2 + q_y^2))$, $\text{Pitch} = \sin^{-1}(2(q_0 q_y - q_z q_x))$, and $\text{Yaw} = \tan^{-1}(2(q_0 q_z + q_x q_y), \; 1 - 2(q_y^2 + q_z^2))$, and $q_0$, $q_x$, $q_y$, and $q_z$ are four factors which configure the quaternion.

The method may further include calculating an Euler rotational axis and angle based on the quaternion, in which the Euler rotational axis is calculated according to an equation of $$\hat{e} = \frac{\vec{q}}{\|\vec{q}\|},$$

the angle of the Euler rotational axis may be calculated according to an equation of $\theta_e = 2\cos^{-1}(q_0)$, where $\vec{q}$ is a vector of a quaternion represented by $\vec{q} = q_x i + q_y j + q_z k$, i, j, and k are unit vectors of individual axes, and $\|\vec{q}\|$ is an absolute value of $\vec{q}$.

The method may further include calculating linear acceleration of an object which is in motion based on the quaternion, in which the linear acceleration is calculated according to an equation of $B_a = -Y_a + C(q)\vec{G}$, $Y_a$ is an acceleration sensor output, C(q) is a quaternion, and $\vec{G}$ is a gravitational acceleration vector.

In another general aspect, an angular velocity calculating apparatus based on an acceleration sensor and a geomagnetic sensor for determining an angular velocity of an object includes an error quaternion setting device, an estimating device, a filter configuring device, a calibrating device, a quaternion calculating device, and an angular velocity calculator. The error quaternion setting device is configured to set an error quaternion. The estimating device is configured to derive a state variable and a variance of the state variable based on the error quaternion, and convert a quaternion-based rotation matrix into an error quaternion-based rotation matrix. The filter configuring device is configured to redefine an acceleration sensor output and an output of the geomagnetic sensor using the error quaternion-based rotation matrix to calculate an observation matrix and an output matrix of a Kalman filter, and transfer the state variable and a variance of the state variable through a discretized transfer matrix to calculate a gain of the Kalman filter. The calibrating device is configured to calibrate the state variable and the variance of the state variable through the gain of the Kalman filter. The quaternion calculating device is configured to calculate a quaternion based on the calibrated state variable and the estimated quaternion. The angular velocity calculator is configured to calculate the angular velocity based on the quaternion.

The estimating device may be configured to set an error quaternion $[q_{ex}, q_{ey}, q_{ez}]'$ of a quaternion $q = [q_0, q_x, q_y, q_z]'$ which expresses a relative angle change between a reference coordinate system and a sensor coordinate system to a state variable (x), when a current state and a previous state have a statistic correlation in which only time delay τ is generated, the state variable x may be expressed by an equation of $\dot{x}=Fx$, F may be a transfer matrix expressed by $$F = -\frac{1}{\tau}\begin{bmatrix} 1 & 0 & 0 \\ 0 & 1 & 0 \\ 0 & 0 & 1 \end{bmatrix},$$

and τ may be a time factor representing an associated degree between the states.

The estimating device may be configured to convert the quaternion-based rotation matrix into the error quaternion-based rotation matrix based on an equation of $C(q)=C(q_e)C(\hat{q})$, the quaternion-based rotation matrix is $$C(q) = \begin{bmatrix} 2q_0^2 + 2q_x^2 - 1 & 2q_xq_y + 2q_0q_z & 2q_xq_z - 2q_0q_y \\ 2q_xq_y - 2q_0q_z & 2q_0^2 + 2q_y^2 - 1 & 2q_yq_z + 2q_0q_x \\ 2q_xq_z - 2q_0q_y & 2q_yq_z - 2q_0q_x & 2q_0^2 + 2q_z^2 - 1 \end{bmatrix},$$

the error quaternion-based rotation matrix is $$C(q_e) \approx \begin{bmatrix} 1 & 2q_{ez} & -2q_{ey} \\ -2q_{ez} & 1 & 2q_{ex} \\ 2q_{ey} & -2q_{ex} & 1 \end{bmatrix} = I_{3\times3} - 2q_e \times,$$

where $q_{ex}$, $q_{ey}$, and $q_{ez}$ are vector component factors of the error quaternion, $q_ex$ represents $$\begin{bmatrix} 0 & -q_{ez} & q_{ey} \\ q_{ez} & 0 & -q_{ex} \\ -q_{ey} & q_{ex} & 0 \end{bmatrix},$$

and $q_0$ is a factor corresponding to $$\cos\left(\frac{\theta}{2}\right)$$

scalar in the quaternion.

The filter configuring device may be configured to redefine an output $Y_a$ of the acceleration sensor and an output $Y_m$ of the geomagnetic sensor based on a correlation between the error quaternion $q_e$ expressed by $C(q)=C(q_e)C(\hat{q})=(I-2q_ex)C(\hat{q})$ and the quaternion-based rotation matrix $C(q)$, the redefined acceleration sensor output $Y_a$ is $Y_a-C(\hat{q})\vec{G}=2C(\hat{q})\vec{G}q_e+B_a+V_a$, the redefined output $Y_m$ of the geomagnetic sensor is $Y_m-C(\hat{q})\vec{M}=2C(\hat{q})\vec{M}q_e+V_m$, $C(\hat{q})$ is an estimated quaternion-based rotation matrix, $I_{3\times3}$ is a 3×3 unit matrix, $\vec{G}$ is a gravitational acceleration vector, $B_a$ may be linear acceleration, $V_a$ may be a noise of the acceleration sensor, $\vec{M}$ may be an earth geomagnetic vector, and $V_m$ may be a noise of the geomagnetic sensor.

The filter configuring device may be configured to calculate an observation matrix of the Kalman filter of $$H = \begin{bmatrix} 2C(\hat{q})\vec{G}q_e \\ 2C(\hat{q})\vec{M}q_e \end{bmatrix}$$

and calculate an output matrix of the Kalman filter of $$Z = \begin{bmatrix} Y_a - C(\hat{q})\vec{G} \\ Y_m - C(\hat{q})\vec{M} \end{bmatrix},$$

based on the acceleration sensor output $Y_a$ and the output $Y_m$ of the geomagnetic sensor.

The filter configuring device may be configured to transfer the state variable x according to an equation of $\hat{x}_{k+1}=F_k\hat{x}_k$, transfer a variance p of the state variable according to an equation of $\hat{P}_{k+1}=F_k\hat{P}_kF'_k+Qd_k$, and then calculate a gain of the Kalman filter according to an equation of $K_k=P_kH'_k(H_k\vec{P}_kH'_k+R)^{-1}$, where $F_k$ is a discretized transfer matrix represented by an equation of $F_k\approx I+F(kT)T+½F(kT)^2T^2$, $Qd_k$ is a discretized process noise variance of Q represented by an equation of $Qd_k\approx QT+½F(kT)+½F(kT)'$, where T is a sampling time, $Z_k$ is an output matrix of the Kalman filter, $H_k$ is an observation matrix of the Kalman filter, and R is a variance of a measurement sensor error.

The calibrating device may be configured to calibrate the state variable according to an equation of $x_k=\hat{x}_k+K_k(Z_k-H_k\hat{x}_k)$ and calibrate a variance of the state variable according to an equation of $P_k=(I-K_kH_k)\vec{P}_k(I-K_kH_k)'+K_kRK'_k$, where $K_k$ is a gain of the Kalman filter, $Z_k$ is an output matrix of the Kalman filter, $H_k$ is an observation matrix of the Kalman filter, I is a 3×3 unit matrix, and R is a variance of a measurement sensor error.

The quaternion calculating device may be configured to calculate the quaternion according to an equation of $q_k=\hat{q}_k\otimes[1\ q_{ex}\ q_{ey}\ q_{ez}]'_k$ after setting the calibrated state variable to be an error quaternion, where $\hat{q}_k$ is an estimated quaternion and $q_{ex}$, $q_{ey}$, and $q_{ez}$ are three-factor variables of the error quaternion.

The angular velocity calculator may be configured to arrange the differential expression according to factors and then discretize to acquire an angular velocity calculating equation represented by an equation of $$\begin{bmatrix} \omega_x^k \\ \omega_y^k \\ \omega_z^k \end{bmatrix} = 2/T \begin{bmatrix} q_0^k - q_0^{k-1} \\ q_x^k - q_x^{k-1} \\ q_y^k - q_y^{k-1} \\ q_z^k - q_z^{k-1} \end{bmatrix} \begin{bmatrix} -q_x^k & q_0^k & q_z^k & q_y^k \\ -q_y^k & -q_z^k & q_0^k & q_x^k \\ -q_z^k & q_y^k & -q_x^k & q_0^k \end{bmatrix}$$

after acquiring a differential expression expressed by an equation of $$\frac{dq(t)}{dt} = \frac{1}{2}W(t)q(t)$$

by differentiating the quaternion, W(t) is an angular velocity vector represented by an equation of $W(t)=[0\ \omega_x\ \omega_y\ \omega_z]'$, where $q_0$, $q_x$, $q_y$, and $q_z$ are four factors which configure the quaternion, and T is a sampling time.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

According to the present disclosure, an angular velocity calculating method and apparatus using an acceleration sensor and a geomagnetic sensor calculate angular velocity using measurement values of the acceleration sensor and the geomagnetic sensor instead of using the gyro sensor.

Figure 1:
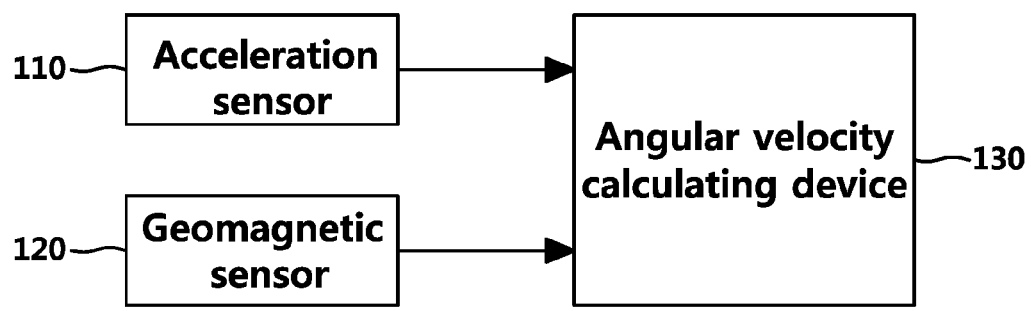
FIG. 1 is a schematic view of an example of an angular velocity calculating apparatus.
Figure 2:
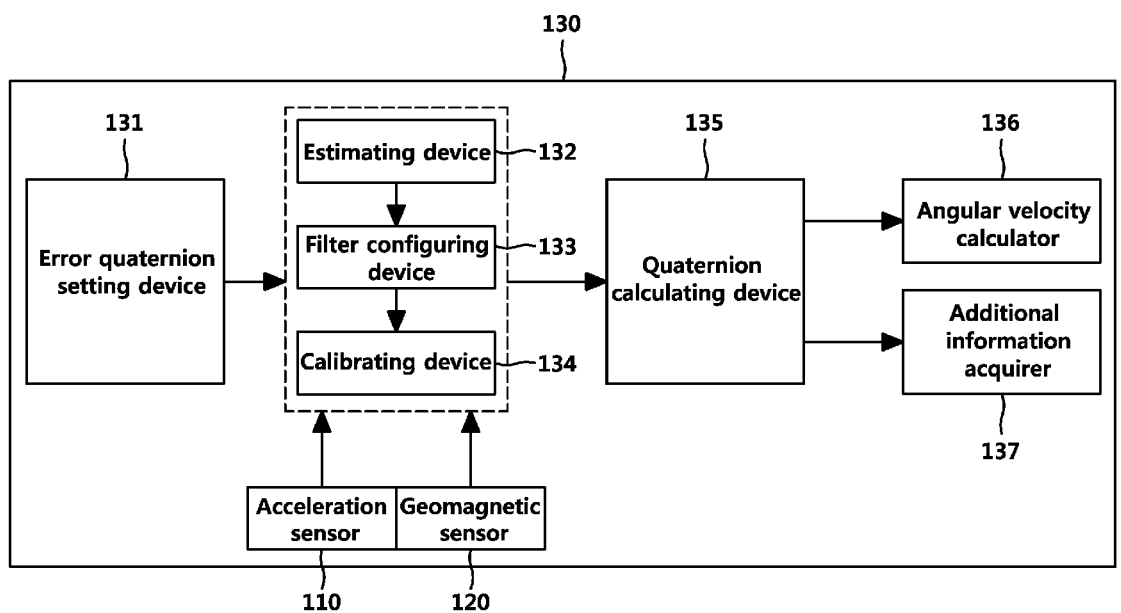
FIG. 2 is a detailed diagram of an example of an angular velocity calculating device.

FIG. 1 is a schematic view of an example of an angular velocity calculating apparatus and FIG. 2 is a detailed diagram of an example of an angular velocity calculating device according to the present disclosure.

Referring to FIGS. 1 and 2, the angular velocity calculating apparatus 100 of the present disclosure may include an acceleration sensor 110, a geomagnetic sensor 120, and an angular velocity calculating device 130.

The acceleration sensor 110 and the geomagnetic sensor 120 are sensors which measure and provide gravitational acceleration information and geomagnetic information.

However, the acceleration sensor 110 and the geomagnetic sensor 120 of the present disclosure provide information required to calculate angular velocity after a calibration process. If the acceleration sensor 110 includes a linear acceleration component in addition to the gravitational acceleration or the geomagnetic sensor 120 includes an offset, precision of an angular velocity calculation operation is significantly degraded.

The angular velocity calculating device 130 uses a Kalman filter to measure a relative angle variation between the user coordinate system and the reference coordinate system, which are used for measurements of the acceleration sensor 110 and the geomagnetic sensor 120, and calculates angular velocity $\omega$ therefrom. Specifically, according to the present disclosure, a method which sets and uses an error quaternion as a state variable is newly suggested to perform angular velocity calculating operations advantageous for linearization based thereon.

More specifically, the angular velocity calculating device 130 of the present disclosure may include an error quaternion setting device 131, an estimating device 132, a filter configuring device 133, a calibrating device 134, a quaternion calculating device 135, and an angular velocity calculator 136.

The error quaternion setting device 131 is configured to set an error quaternion. The estimating device 132 is configured to derive a state variable and a variance of the state variable based on the error quaternion, and convert a quaternion-based rotation matrix into an error quaternion-based rotation matrix. The filter configuring device 133 is configured to redefine an acceleration sensor output and an output of the geomagnetic sensor using the error quaternion-based rotation matrix to calculate an observation matrix and an output matrix of the Kalman filter, and transfer the state variable and the variance of the state variable through a discretized transfer matrix to calculate a gain of the Kalman filter. The calibrating device 134 is configured to calibrate the state variable and the variance of the state variable through the gain of the Kalman filter. The quaternion calculating device 135 is configured to calculate the quaternion-based on the calibrated state variable and the estimated quaternion. The angular velocity calculator 136 is configured to calculate angular velocity based on the quaternion.

If necessary, the angular velocity calculating device 130 of the present disclosure may further include an additional information acquirer 137 that calculates additional information such as an Euler angle, an Euler rotational axis and an angle, and linear acceleration, and a rotation matrix based on the quaternion.

As described above, the angular velocity calculating device 100 of the present disclosure does not use an actual gyro sensor, but uses the acceleration sensor 110 and the geomagnetic sensor 120 to calculate angular velocity that is generated by an actual gyro sensor, so as to avoid the problems or cons of a gyro sensor.

Moreover, the acceleration sensor 110 and the geomagnetic sensor 120 of the present disclosure may be sensors that are separately implemented for the angular velocity calculating apparatus 100, but may be a velocity sensor and an acceleration sensor which have been already provided in another device (for example, a portable terminal, a vehicle, a drone, and a game machine) in some cases.

That is, the angular velocity calculating apparatus of the present disclosure may be implemented in one independent hardware apparatus that includes the acceleration sensor 110, the geomagnetic sensor 120, and the angular velocity calculating device 130. However, in some cases, the angular velocity calculating apparatus may be implemented in an embedded form in which only the angular velocity calculating device 130 is mounted in another device or may be implemented in a software form in which only the angular velocity calculating device 130 is mounted in the other device or downloaded and provided in the other device.

Figure 3:
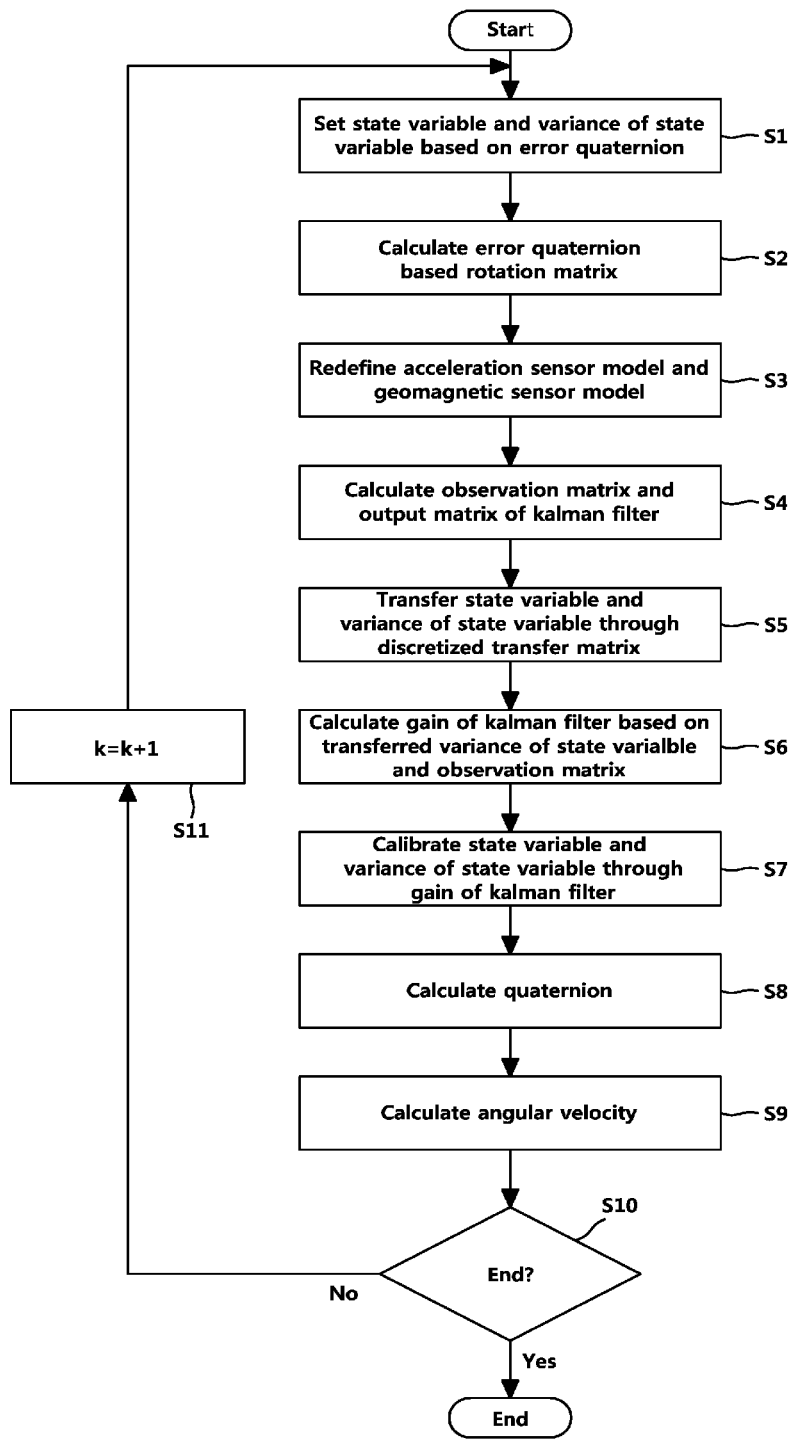
FIG. 3 is a flowchart of an example of an operation of an angular velocity calculating method using an acceleration sensor and a geomagnetic sensor.

FIG. 3 is a flowchart of an example of an operation of an angular velocity calculating method using an acceleration sensor and a geomagnetic sensor.

Referring to FIG. 3, the angular velocity calculating method of the present disclosure may include steps S1-S10. Step S1 derives a state variable and a variance of the state variable based on an error quaternion. Step S2 converts a quaternion-based rotation matrix into an error quaternion-based rotation matrix. Step S3 redefines an accelerometer output and an output of the geomagnetic sensor using the error quaternion-based rotation matrix. Step S4 calculates an observation matrix and an output matrix of the Kalman filter. Step S5 transfers the state variable and the variance of the state variable through a discretized transfer matrix. Step S6 calculates a gain of the Kalman filter based on the transferred variance of the state variable and the observation matrix of the Kalman filter. Step S7 calibrates the state variable and the variance of the state variable through the gain of the Kalman filter. Step S8 calculates a quaternion-based on the calibrated state variable and an estimated quaternion. Step S9 calculates angular velocity based on the quaternion. Step S10 inquires whether to request an end to the process. Step S11 re-enters step S1 to calculate angular velocity at a subsequent time when the angular velocity calculating process is still ongoing.

The angular velocity calculating method of the present disclosure may be described in more detail with reference to FIGS. 3 to 6.

The geomagnetic sensor 120 indicates a magnetic north direction in any circumstances to determine an absolute direction of the sensor.

Figure 4:
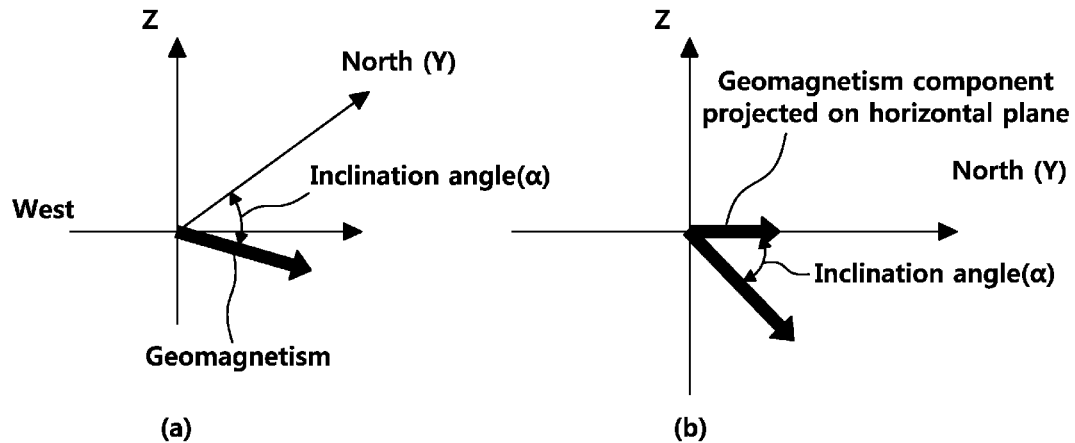
FIG. 4 is a view illustrating a geomagnetic sensor and a coordinate system in the Northern hemisphere.

FIG. 4 is a view illustrating the geomagnetic sensor 120 and a coordinate system in the Northern hemisphere. Referring to FIG. 4, it is understood that an inclination angle α is an angle with respect with a horizontal plane of the Earth when the geomagnetic sensor 120 is directed to the magnetic north. The inclination angle horizontal with the ground is "0" in the equator and approaches "90" degrees when it is closer to the North Pole. The inclination angle α is an angle affected by the position of the Earth but a component projected on the horizontal plane is directed to the magnetic north—a direction that does not change. The inclination angle α does not change unless a disturbance exists. Geologically, the Earth's magnetic force line starts from the South Pole, that is, a magnetic south and is directed to the magnetic north. The Earth's magnetic force line is affected by a change of magnetism in the Earth and climate change. The International Association of Geomagnetism and Aeronomy announces a new geomagnetic standard which serves as a reference based on the Earth model every five years. The magnitude of the geomagnetic intensity on Earth varies depending on the position from approximately 25 to 65 μTesla (or 0.25 to 0.65 Gauss).

Figure 5:
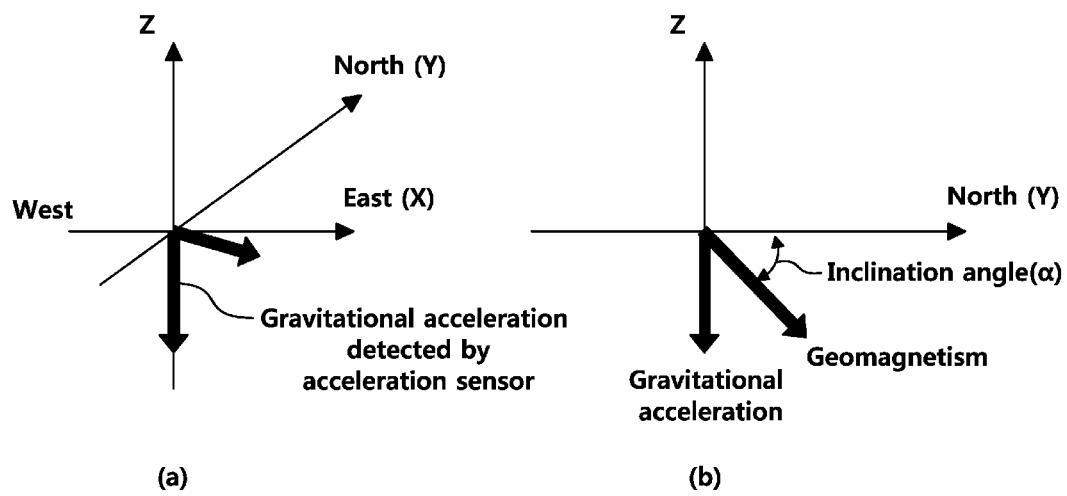
FIG. 5 is a view illustrating a coordinate system in which a geomagnetic sensor and an acceleration sensor simultaneously operate.

FIG. 5 is a view illustrating a coordinate system in which a geomagnetic sensor and an acceleration sensor simultaneously operate. Referring to FIG. 5, it is understood that the gravitational acceleration detected by the acceleration sensor 110 is directed to a vertical direction, the geomagnetism forms an inclination angle with the horizontal plane and is directed to the magnetic north. When there is no linear acceleration in the acceleration sensor 110, 9.8 m/sec² of the gravitational acceleration is detected in a −z direction.

The gravitational acceleration and geomagnetism are invariants that are detected in a reference coordinate system (reference frame or inertial frame X-Y-Z). However, the actual acceleration sensor 110 and geomagnetic sensor 120 acquire sensor output values in the user coordinate system (body frame X-Y-Z) so that when the user coordinate system rotates to match the coordinate systems, inversely, an angle of the user coordinate system may be calculated from the rotation angle.

The user coordinate system has moving and rotating characteristics, but only a change of the angle caused by the rotation is calculated in the present disclosure. ω is angular velocity when rotating around an arbitrary axis and causes a change of the angle with respect to the reference coordinate system.

That is, in the present disclosure, two vectors of the acceleration sensor and the geomagnetic sensor that are measured in the user coordinate system are ultimately converted into the reference coordinate system to calibrate the acceleration sensor and the geomagnetic sensor, and the angular velocity is calculated based on a relative angle change of the reference coordinate system and the user coordinate system which is generated at this time.

Figure 6:
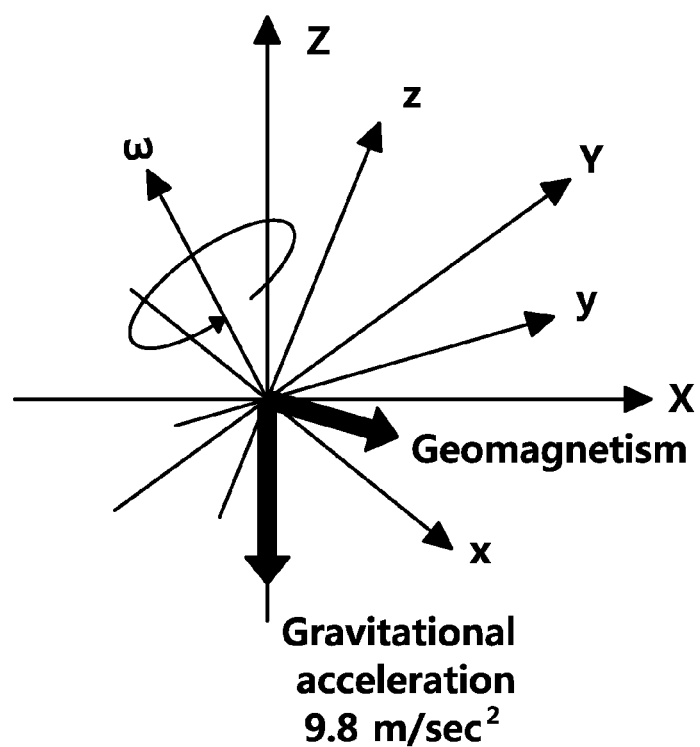
FIG. 6 is a view representing a relative angle change of a reference coordinate system and a user coordinate system.

In the present disclosure, in order to represent the relative angle change of the reference coordinate system and the user coordinate system as illustrated in FIG. 6, a quaternion expression method as represented in Equation 1 or 2 may be introduced.

$$q = [q_0 \; q_1 \; q_2 \; q_3]' \in R^4 \qquad \text{Equation 1}$$

$$q = [q_0 \; q_x \; q_y \; q_z]' \in R^4 \qquad \text{Equation 2}$$

In this case, $q_0$ is a factor corresponding to $$\cos\left(\frac{\theta}{2}\right)$$

scalar in the quaternion. $q_1$, $q_2$, and $q_3$ or $q_x$, $q_y$, and $q_z$ are $\sin(\theta/2)i$, $\sin(\theta/2)j$, $\sin(\theta/2)k$ which correspond to vectors of x, y, and z axes, respectively. $R^4$ expresses that the quaternion is a variable formed of four factors.

θ represents an Euler angle or a rotation angle according to a definition of Charles. i, j, and k are unit vectors of individual axes and the sign "'" is a transpose matrix.

An arbitrary point $P_n$ in the space may be expressed by the reference coordinate system, $P_b$ may be expressed by the user coordinate system and the correlation of $P_n$ and $P_b$ may be expressed by a rotation matrix C(q). This is represented by the quaternion to obtain Equation 3.

$$P_n = C(q) P_b \qquad \text{Equation 3}$$

The rotation matrix C(q) is expressed by Equation 4. Next, when the quaternion is calculated and then converted into the rotation matrix, Equation 4 is utilized.

$$C(q) = \begin{bmatrix} 2q_0^2 + 2q_x^2 - 1 & 2q_x q_y + 2q_0 q_z & 2q_x q_z - 2q_0 q_y \\ 2q_x q_y - 2q_0 q_z & 2q_0^2 + 2q_y^2 - 1 & 2q_y q_z + 2q_0 q_x \\ 2q_x q_z + 2q_0 q_y & 2q_y q_z - 2q_0 q_x & 2q_0^2 + 2q_z^2 - 1 \end{bmatrix} \qquad \text{Equation 4}$$

When the coordinate system rotates at specific angular velocity, a differential value of the quaternion may be expressed by an equation of motion of Equation 5 using the specific angular velocity.

$$\dot{q} = \tfrac{1}{2} q \otimes \omega \qquad \text{Equation 5}$$

In this case, $\otimes$ is not a normal multiplication, but is a multiplication of quaternion which is different from the existing multiplication. The quaternion has four elements and the angular velocity has three elements so that different calculating methods are performed. Equation 5 is a formula used to calculate a quaternion at a subsequent time using a quaternion at a present time when the coordinate system rotates at the specific angular velocity ω. The formula of Equation 5 is used in a step of estimating a Kalman filter later.

The gravitational acceleration G in the reference coordinate system measured in the acceleration sensor and the Earth geomagnetism M measured in the geomagnetic sensor may be expressed as vectors as represented in Equations 6 and 7.

$$\vec{G} = \begin{bmatrix} 0 \\ 0 \\ 9.8 \end{bmatrix} \qquad \text{Equation 6}$$

$$\vec{M} = \begin{bmatrix} 0 \\ \cos(\alpha) \\ -\sin(\alpha) \end{bmatrix} \qquad \text{Equation 7}$$

In Equation 7, α is an inclination angle in FIG. 1. Specifically, the geomagnetism includes an intensity $M_0$ of the geomagnetism. The geomagnetic intensity varies according to the position of the user, so that the measured value is processed to be dimensionless to utilize only the angle information. The inclination angle is directed upwardly on the horizontal plane in the Southern hemisphere and a sign thereof is changed to "-". Further, the reason why the gravitational acceleration is not processed to be dimensionless is that the gravitational acceleration is a constant number that does not vary according to the position so that the gravitational acceleration does not affect the expansion of the equation.

In the present disclosure, the gravitational acceleration vector and the geomagnetic vector, that is, two vectors serve as references to calculate a relative angle of an arbitrary vector in the space and to this end, the Kalman filter is applied.

Specifically, in the present disclosure, an indirect Kalman filter method that is configured by an error quaternion $\vec{q}_e$, which is more advantageous for linearization than the quaternion is utilized. The error quaternion is defined as represented in Equation 8 and is also utilized as a state of the state equation.

A physical amount which is estimated in the Kalman filter is a quaternion representing rotation information of the user coordinate system. Actually, the quaternion may be estimated based on a dynamic property of the system. The estimated quaternion $\hat{q}$ may include an error. Due to an error caused by the mathematical model and an error generated when a nonlinear system is linearized, when the quaternion q is estimated, an error is inevitably included. This is an error which is inevitably generated even when the quaternion is estimated using the motion equation of Equation 5. The estimated quaternion including an error is expressed by $\hat{q}$. A calibration process to the Kalman filter is applied needs to be implemented and this process needs to be implemented using the acceleration and the geomagnetic value which are information ensured through the measurement. A quaternion which is used for quaternion calibration is a quaternion which represents a minute change amount, that is, an error quaternion ($\vec{q}_e$ or $q_e$). The estimation and calibration of the Kalman filter are performed using Equations 5 and 8.

$$q = \hat{q} \otimes q_e \qquad \text{Equation 8}$$

$$q_e = \begin{bmatrix} 1 \\ \vec{q}_e \end{bmatrix} \qquad \text{Equation 9}$$

In this case, $\vec{q}_e$ is $[q_{ex}, q_{ey}, q_{ez}]'$.

In the present disclosure, the acceleration sensor $Y_a$ and the geomagnetic sensor $Y_m$, which are used to calculate the angular velocity ω using the Kalman filter, are defined by output equations (or output models) as represented in Equations 10 and 11.

$$Y_a = C(q)\vec{G} + B_a + V_a \qquad \text{Equation 10}$$

$$Y_m = C(q)\vec{M} + V_m \qquad \text{Equation 11}$$

In Equations 10 and 11, C(q) is a rotation matrix. In Equation 10, which is an output equation of the acceleration sensor, $B_a$ is linear acceleration and is not represented in Equation 10 in a normal state (that is, when acceleration does not exist). $V_a$ is a noise of the acceleration sensor and an average thereof is "0". $V_m$ is a noise of the geomagnetic sensor and an average thereof is also "0". The variance varies depending on manufacturers of the acceleration sensor and the geomagnetic sensor so that a performance specification table is provided to the user. $R_a$ is a variance of the acceleration sensor and $R_m$ is a variance of the geomagnetic sensor.

$$E(V_a V'_a) = R_a \qquad \text{Equation 12}$$

$$E(V_m V'_m) = R_m \qquad \text{Equation 13}$$

It is assumed that an offset of the acceleration sensor or the geomagnetic sensor is calibrated to be removed from the output equation of the sensor. In the geomagnetic sensor, the offset needs to be removed through a separate calibration process. When there is an offset, the offset causes an error in all processes that will be calculated thereafter. The offset is not a unique output value of the sensor but the offset is affected by its surrounding environment. Thus, when the sensor is used in a new environment, the offset needs to be recalibrated.

In order to configure the Kalman filter, as represented in Equation 5, the motion equation using the angular velocity ω is generally used. However, an object of the present disclosure is to functionally implement the gyro sensor so as to avoid using the gyro sensor, i.e., the functionality of a gyro sensor is implemented using an acceleration sensor and a geomagnetic sensor.

To this end, it is assumed that the current state and the previous state have a statistical correlation in which only time delay τ is generated. This may be assumed as a random process and it is assumed that a relationship between states is exponentially correlated. As a physical meaning, it means that a state at the present time and a state at a subsequent time are not significantly changed. This assumption is valid because a dynamic behavior of an operation of the user is significantly slower than a dynamic characteristic of the sensor so that factors, other than the motion of the user, are insignificant. Therefore, the dynamic characteristic of the user's motion when the user uses a mobile device such as a mobile phone does not affect the dynamic characteristics of the sensors. A state equation as represented in the following Equation 14 will be derived based on this assumption.

$$\dot{x} = Fx + Gw(t) \qquad \text{Equation 14}$$

F and G are represented as follows.

$$F = -\frac{1}{\tau}\begin{bmatrix} 1 & 0 & 0 \\ 0 & 1 & 0 \\ 0 & 0 & 1 \end{bmatrix} \qquad \text{Equation 15}$$

$$G = \begin{bmatrix} 1 & 0 & 0 \\ 0 & 1 & 0 \\ 0 & 0 & 1 \end{bmatrix} \qquad \text{Equation 16}$$

In this case, τ is a time factor representing a correlated degree between states and may be represented by a constant. τ may have a value of 0.1 to 0.6 depending on an application system through experiment.

x is a state, F represents a transfer matrix, G represents a noise matrix, and w(t) represents a system noise. Equation 14 is a normal Kalman filter transfer equation so that in order to apply indirect Kalman filter, the state is set to be an error quaternion and is expressed by the following Equation 17. In Equation 17, the reason why only three elements corresponding to vector parts are selectively applied when the error quaternion is used as the state is that a part corresponding to the scalar is 1 which is a constant so that the part cannot be a variable.

$$x = \begin{bmatrix} q_{ex} \\ q_{ey} \\ q_{ez} \end{bmatrix} \qquad \text{Equation 17}$$

The current state is transferred to the subsequent state using Equation 14. Due to the property of the Kalman filter, the variance of the state variable needs to be transferred together, which will be expressed by the following Equation 18.

$$\hat{P}(t) = E\{(x(t) - \hat{x}(t))(x(t) - \hat{x}(t))'\} \qquad \text{Equation 18}$$

In this case, x is a state variable, $\hat{x}$ is an estimated state variable, and represents a transpose matrix.

The estimated state is calibrated using Equation 18 and the calibration uses the measurement value. When a system transfer matrix is regenerated based on the error quaternion, it may be expressed by Equation 19.

$$\dot{\hat{q}}_e = F\hat{q}_e + Gw(t) \qquad \text{Equation 19}$$

Equations 18 and 19 represent state estimating status, which are expressed by a symbol "^". Further, the rotation matrix C(q) represented in the sensor output equations of Equations 10 and 11 is expressed by the quaternion q rather than the error quaternion $q_e$ so that the rotation matrix needs to be expanded by an error quaternion suitable for Equation 19.

Therefore, when the rotation matrix is regenerated using Equation 8, the rotation matrix is expressed by a product of the estimated quaternion-based rotation matrix and the error quaternion-based rotation matrix and an error quaternion-based rotation matrix as represented in Equation 21 may be obtained based thereon.

$$C(q) = C(q_e)C(\hat{q}) \qquad \text{Equation 20}$$

$$C(q_e) = \begin{bmatrix} 1 + 2q_{ex}^2 & 2q_{ex}q_{ey} + 2q_{ez} & 2q_{ex}q_{ez} - 2q_{ey} \\ 2q_{ex}q_{ey} - 2q_{ez} & 1 + 2q_{ey}^2 & 2q_{ey}q_{ez} + 2q_{ex} \\ 2q_{ex}q_{ez} + 2q_{ey} & 2q_{ey}q_{ez} - 2q_{ex} & 1 + 2q_{ez}^2 \end{bmatrix} \qquad \text{Equation 21}$$

In this case, under an assumption that $q_{ex}$, $q_{ey}$, $q_{ez}$ are minute amounts and products those are more minute amounts, terms belonging to Equation 22 may be removed so that Equation 21 may be simplified as represented in Equation 23.

$$q_{ex}q_{ey} = q_{ey}q_{ez} = q_{ex}q_{ez} = q_{ex}^2 = q_{ey}^2 = q_{ez}^2 \approx 0 \qquad \text{Equation 22}$$

$$C(q_e) \approx \begin{bmatrix} 1 & 2q_{ez} & -2q_{ey} \\ -2q_{ez} & 1 & 2q_{ex} \\ 2q_{ey} & -2q_{ex} & 1 \end{bmatrix} = I_{3\times 3} - 2q_e \times \qquad \text{Equation 23}$$

In this case, $q_e x$ represents $$\begin{bmatrix} 0 & -q_{ez} & q_{ey} \\ q_{ez} & 0 & -q_{ex} \\ -q_{ey} & -2q_{ex} & 0 \end{bmatrix}$$

and is a sign simply expressing a process of multiplying an arbitrary 3×1 matrix or 3×3 matrix.

Further, $C(\hat{q})$ in Equation 20 is an estimated quaternion-based rotation matrix and is represented as in Equation 23.

$$C(q) = C(q_e)C(\hat{q}) = (I - 2q_e x)C(\hat{q}) \qquad \text{Equation 24}$$

Finally, since the rotation matrix is expressed based on the error quaternion $q_e$, the rotation matrix may be substituted into the state equation of Equation 19. The sensor output equation may be re-represented using Equation 24 as follows.

$$Y_a - C(\hat{q})\vec{G} = 2C(\hat{q})\vec{G}q_e + B_a + V_a \qquad \text{Equation 25}$$

$$Y_m - C(\hat{q})\vec{M} = 2C(\hat{q})\vec{M}q_e + V_m \qquad \text{Equation 26}$$

An observation matrix of the Kalman filter is represented based on Equations 25 and 26 as follows.

$$H = \begin{bmatrix} 2C(\hat{q})\vec{G}q_e \\ 2C(\hat{q})\vec{M}q_e \end{bmatrix} \qquad \text{Equation 27}$$

The output matrix of the Kalman filter is expressed by Equation 28.

$$Z = \begin{bmatrix} Y_a - C(\hat{q})\vec{G} \\ Y_m - C(\hat{q})\vec{M} \end{bmatrix} \qquad \text{Equation 28}$$

In order to apply the present disclosure to an actual product, a discretization process is necessary. When the transfer matrix is discretized, a sampling time is expressed by T. Since the error quaternion (that is, the state variable and variance of the state variable) is transferred using the discretized transfer matrix, transfer equations of the state variable and the variance of the state variable are expressed by Equations 29 and 30.

For reference, in Equations 14 and 19, Gw(t) is included. However, Equation 29 is an equation for a process of transferring an estimated value and w(t) is a noise whose average is "0", so that in Equation 29 which is expanded by estimated value, Gw(t) is erased.

$$\hat{x}_{k+1} = F_k \hat{x}_k \qquad \text{Equation 29}$$

$$\hat{P}_{k+1} = F_k \hat{P}_k F'_k + Qd_k \qquad \text{Equation 30}$$

In this case, $F_k$ is a discretized transfer matrix and T is a sampling time.

$$F_k = e^{F*T} = e^{-\frac{T}{\tau}\begin{bmatrix} 1 & 0 & 0 \\ 0 & 1 & 0 \\ 0 & 0 & 1 \end{bmatrix}} \qquad \text{Equation 31}$$

Further, $Q_{dk}$ is a discretized process noise variance of Q so that it is expressed as in Equation 32. When Equations 31 and 32 are more simplified under an assumption that an equation including an integral element is a first-order linear equation, Equations 31 and 32 are expressed by Equations 33 and 34.

$$Qd_k = \int_k^{k+1} e^{F*T} Q e^{F*T'} dt \qquad \text{Equation 32}$$

$$F_k \approx I + F(kT)T + 1/2 F(kT)^2 T^2 \qquad \text{Equation 33}$$

$$Qd_k \approx QT + 1/2 F(kT) + 1/2 F(kT)' \qquad \text{Equation 34}$$

When a gain of the Kalman filter is calculated using the above-described equations, the gain is expressed by Equation 35.

$$K_k = \hat{P}_k H'_k (H_k \hat{P}_k H'_k + R)^{-1} \qquad \text{Equation 35}$$

In Equation 35, the matrix R is a measurement matrix variance of the sensor or a variance of a measurement sensor error and may be defined by the following Equation 36 using the above-described Equations 12 and 13.

$$R = \begin{bmatrix} R_a I_{3\times 3} & 0_{3\times 3} \\ 0_{3\times 3} & R_m I_{3\times 3} \end{bmatrix} \qquad \text{Equation 36}$$

In this case, $I_{3\times 3}$ is a 3×3 unit matrix and $0_{3\times 3}$ is a 3×3 0 matrix.

When the state variable and the variance of the state variable are calibrated using the gain of the Kalman filter, the calibrated state variable and variance of the state variable are expressed by Equations 37 and 38.

$$x_k = \hat{x}_k + K_k(Z_k - H_k \hat{x}_k) \qquad \text{Equation 37}$$

$$P_k = (I - K_k H_k)\hat{P}_k (I - K_k H_k)' + K_k R K'_k \qquad \text{Equation 38}$$

It is confirmed that when the calibration is performed in Equations 37 and 38, the state variable and the variance of the state variable are not estimated variables, so that "^" disappears.

The calibrated state variable $x_k$ is an error quaternion $q_e$ and as represented in Equation 39, the error quaternion $q_e$ and the estimated quaternion are multiplied to calculate the quaternion q. In this case, the quaternion q is a variable having four factors and the error quaternion $q_e$ is a variable having three factors, so that a constant of 1 is added to a factor corresponding to scalar in the error quaternion $q_e$.

$$q_k = \hat{q}_k \otimes [1 \ q_{ex} \ q_{ey} \ q_{ez}]'_k \qquad \text{Equation 39}$$

The process of calculating the angular velocity $\vec{\omega} = \omega_x i + \omega_y j + \omega_z k$ in the quaternion calculated as described above is as follows.

First, when the quaternion is differentiated, it is expressed by the following Equation 40.

$$\frac{dq(t)}{dt} = \frac{1}{2} W(t) q(t) \qquad \text{Equation 40}$$

In this case, W(t) represents an angular velocity vector as represented in Equation 5, but the quaternion is a variable having four factors and $\vec{\omega}$ is a variable having three factors, so that W(t) is a variable which is adjusted to be W(t)=[0 $\omega_x$ $\omega_y$ $\omega_z$]' for calculation.

Equation 40 is represented for every factor as follows.

$$\frac{dq_0}{dt} = -\frac{1}{2}(\omega_x q_x + \omega_y q_y + \omega_z q_z) \qquad \text{Equation 41}$$

$$\frac{dq_x}{dt} = \frac{1}{2}(\omega_x q_0 + \omega_y q_z - \omega_z q_y)$$

$$\frac{dq_y}{dt} = \frac{1}{2}(\omega_y q_0 + \omega_z q_x - \omega_z q_z)$$

$$\frac{dq_z}{dt} = -\frac{1}{2}(\omega_z q_0 + \omega_x q_y - \omega_z q_z)$$

Equation 41 may be represented to be Equation 42.

$$W(t) = 2\frac{dq(t)}{dt} q(t)^{-1} \qquad \text{Equation 42}$$

In this case, $q^{-1}$ is $q^{-1} = [q_0 \ -q_x \ -q_y \ -q_z]'$ according to the definition.

Equations 41 and 42 are discretized to calculate $\omega_x^k$, $\omega_y^k$, $\omega_z^k$ as represented in Equation 43. In this case, an index k−1 represents a previous step of the discretized variable.

$$\begin{bmatrix} \omega_x^k \\ \omega_y^k \\ \omega_z^k \end{bmatrix} = 2/T \begin{bmatrix} q_0^k - q_0^{k-1} \\ q_x^k - q_x^{k-1} \\ q_y^k - q_y^{k-1} \\ q_z^k - q_z^{k-1} \end{bmatrix} \begin{bmatrix} -q_x^k & q_0^k & q_z^k & q_y^k \\ -q_y^k & -q_z^k & q_0^k & q_x^k \\ -q_z^k & q_y^k & -q_x^k & q_0^k \end{bmatrix} \qquad \text{Equation 43}$$

By doing this, an angular velocity which is typically measured by a gyro sensor may be calculated using the acceleration sensor and the geomagnetic sensor based on Equation 43. Thus, the functionality of a gyro sensor is implemented using an acceleration sensor and a geomagnetic sensor, i.e., an angular velocity of an object or device is determined without a gyro sensor using an acceleration sensor and a geomagnetic sensor.

Figure 7:
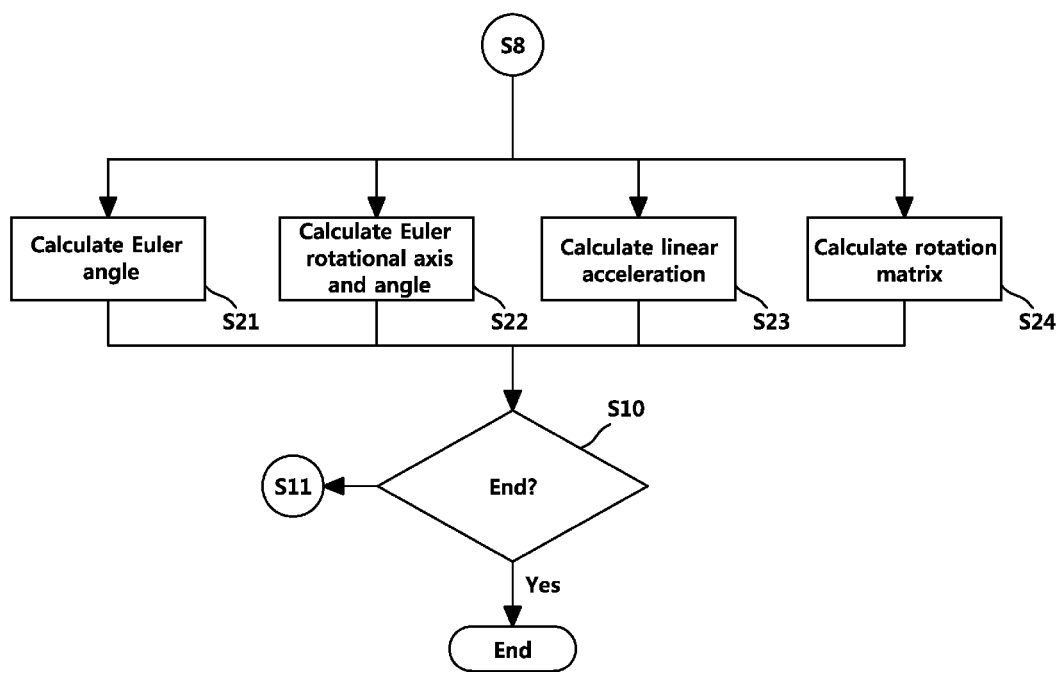
FIG. 7 is a flowchart of another example of an operation of an angular velocity calculating method using an acceleration sensor and a geomagnetic sensor.

FIG. 7 is a flowchart of another example of an operation of an angular velocity calculating method using an acceleration sensor and a geomagnetic sensor.

As illustrated in FIG. 7, an angular velocity calculating method according to another example of the present disclosure may further include at least one of a step S21 of calculating an Euler angle using the above-described quaternion, a step S22 of calculating Euler rotational axis and angle using the quaternion, a step S23 of calculating linear acceleration using the quaternion, and a step S24 of calculating a rotation matrix using the quaternion.

The above-described quaternion may be converted into various types of outputs.

First, the Euler angle may be expressed using the quaternion as represented in following Equations 44, 45, and 46. The Euler angles are represented to be different according to an order of rotating an axis so that 12 combinations of Euler angles may be expressed. In the present disclosure, as a representative example, the axes rotate in the order of a z axis, a y axis, and an x axis (3-2-1).

$$\text{Roll}=\tan^{-1}(2(q_0q_x+q_yq_z),1-2(q_x^2+q_y^2)) \quad \text{Equation 44}$$

$$\text{Pitch}=\sin^{-1}(2(q_0q_y-q_zq_x)) \quad \text{Equation 45}$$

$$\text{Yaw}=\tan^{-1}(2(q_0q_z+q_xq_y),1-2(q_y^2+q_z^2)) \quad \text{Equation 46}$$

Further, the Euler axis ê and the Euler angle $\theta_e$ may be expressed using the quaternion by Equations 47 and 48.

$$\hat{e} = \frac{\vec{q}}{\|\vec{q}\|} \quad \text{Equation 47}$$

$$\theta_e = 2\cos^{-1}(q_0) \quad \text{Equation 48}$$

In this case, $\vec{q}=q_x i+q_y j+q_z k$ is an element corresponding to a vector of the quaternion, i, j, and k are unit vectors in each axis, and $\|\vec{q}\|$ represents an absolute value of the vector $\vec{q}$.

In Equation 10, $Y_a$ is an output value measured by the acceleration sensor and $\vec{G}$ is gravitational acceleration, so that linear acceleration of an object which is in motion may also be calculated using the quaternion as represented in Equation 49.

$$B_a=-Y_a+C(q)\vec{G} \quad \text{Equation 49}$$

Further, the above-described rotation matrix as represented in Equation 4 may also be calculated using the quaternion.

Figure 8:
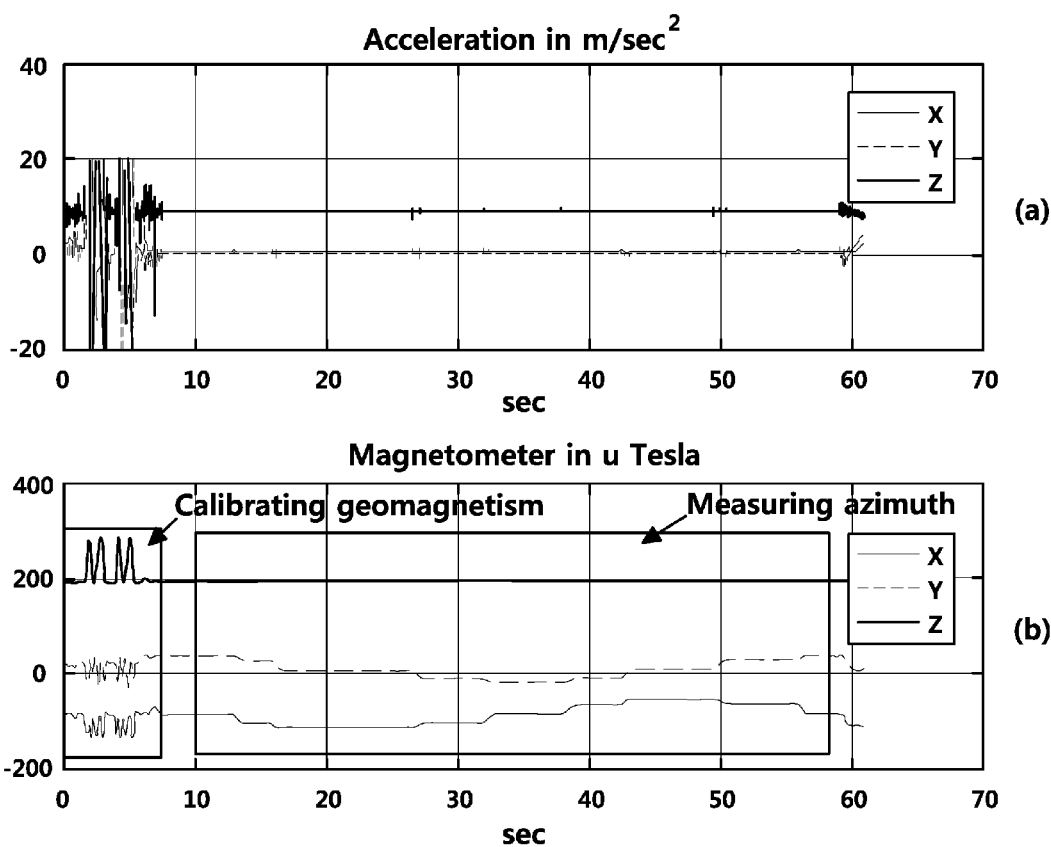
FIGS. 8 to 10 are views depicting an example of a performance of an angular velocity calculating method using an acceleration sensor and a geomagnetic sensor.
Figure 9:
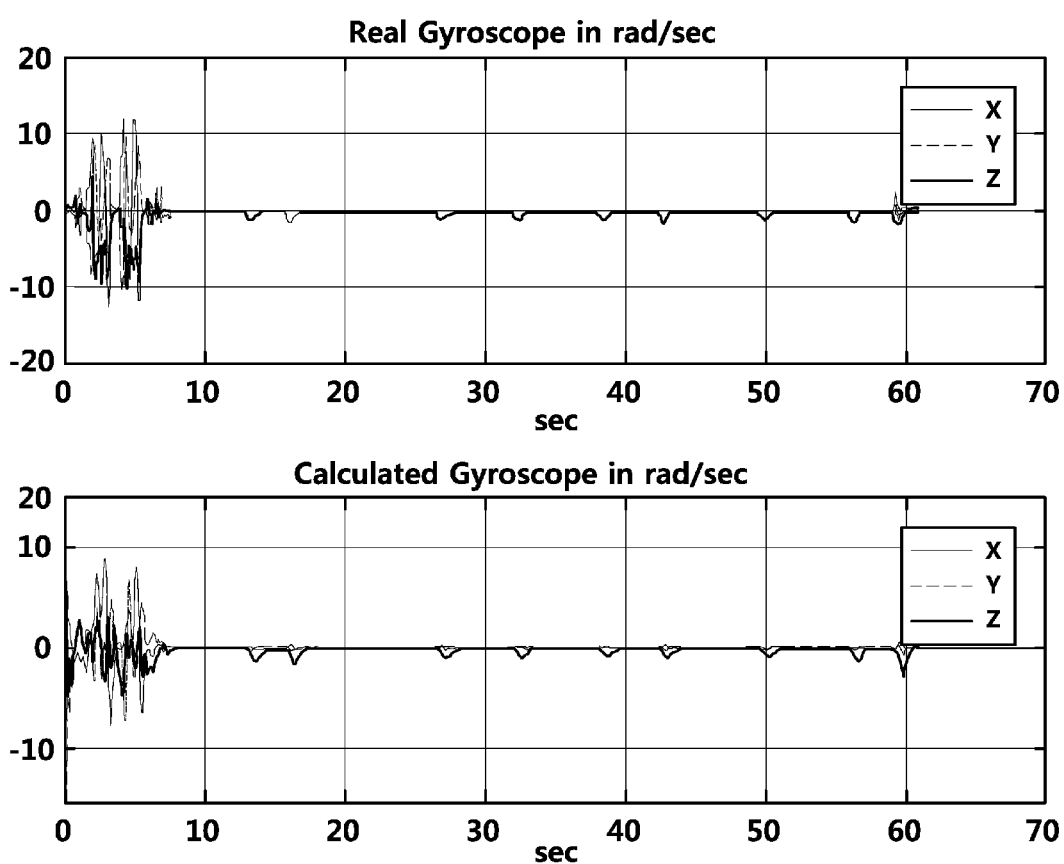
Figure 10:
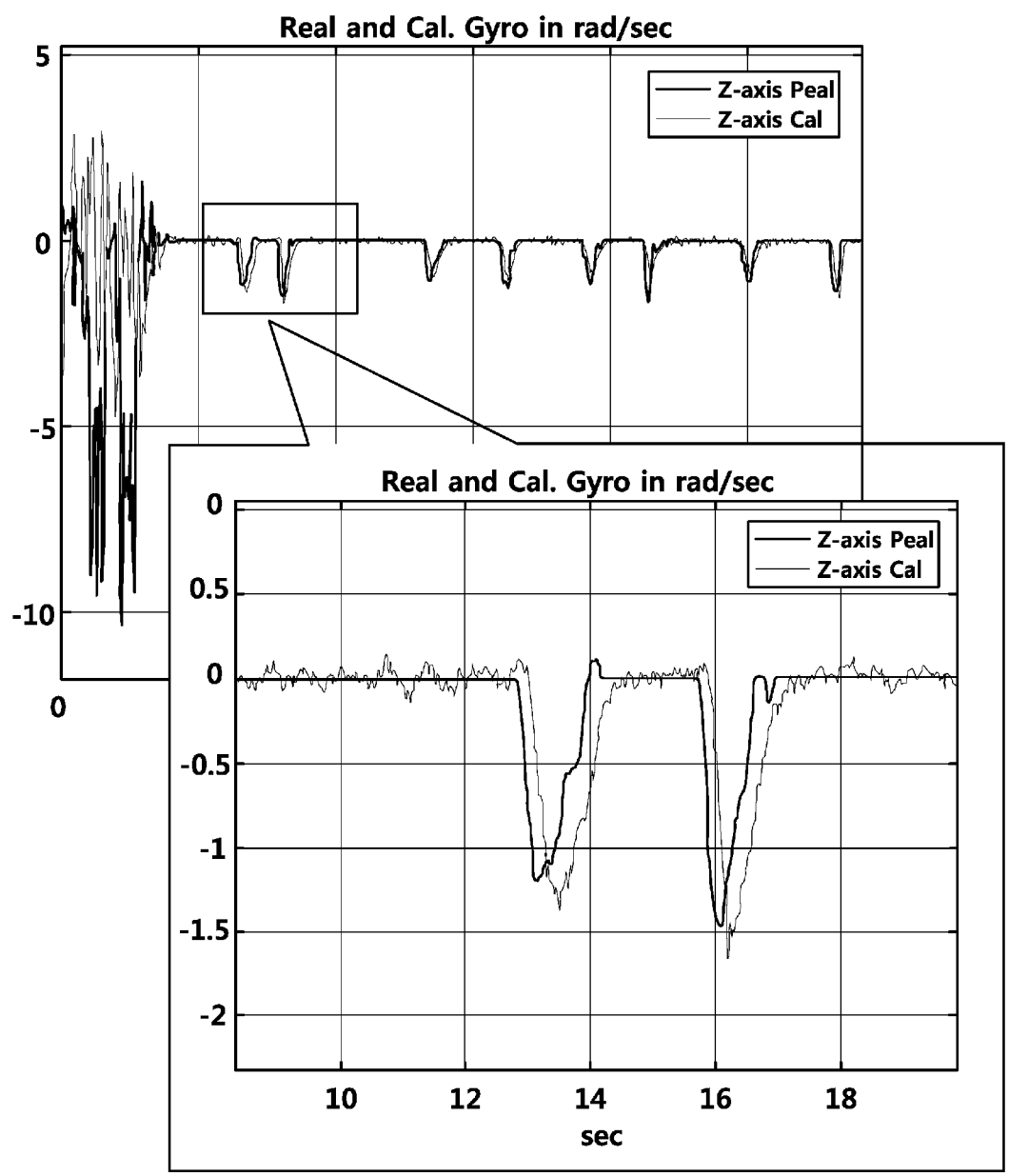

FIGS. 8 to 10 are views depicting an example of a performance of an angular velocity calculating method based on an acceleration sensor and a geomagnetic sensor.

FIG. 8 is a view for comparing actual measurement values of an acceleration sensor and a geomagnetic sensor when the geomagnetic sensor is calibrated and an azimuth is measured. It is understood that when the geomagnetic sensor is calibrated and an azimuth is measured, the acceleration sensor and the geomagnetic sensor horizontally operate, so that slight rotation acceleration due to a rotational motion is detected from a signal of the acceleration sensor but linear acceleration is not detected.

FIG. 9 is a view for comparing an actual measurement value of the gyro sensor and a calculated value of angular velocity according to the present disclosure.

Referring to FIG. 9, it is observed that in an output of the gyro sensor, a rotational motion is measured only on the z axis. However, the calculated value of the angular velocity includes noise signal not only on the z axis, but also on the x axis and the y axis. This is because a noise generated during the process of differentiating the quaternion is mixed. The shorter the sampling time, the larger the noise. However, the noise is a random noise so that the average thereof is "0". Therefore, the noise may be easily removed by applying an average filter and saturation phenomenon which is generated as time passes by may be avoided.

FIG. 10 is a view for comparing a value of a z axis of the gyro sensor and a value of a z axis of the calculated angular velocity. Referring to FIG. 10, it is confirmed that even though a time delay and a noise are observed from the signal of the z axis of the calculated angular velocity, the signal faithfully follows a basic form of the z axis value of the gyro sensor. The noise may be removed using the average filter and a degree of time delay may be tuned by adjusting τ of Equation 15.

Therefore, according to the present disclosure, the need for an actual gyro sensor is obviated, which prevents various problems due to the gyro sensor, thereby reducing cost, manufacturing complexity, power consumption, and the size of the device that previously included the actual gyro sensor.

The acceleration sensor 110, geomagnetic sensor 120, angular velocity calculating device 130, error quaternion setting device 131, estimating device 132, filter configuring device 133, calibrating device 134, quaternion calculating device 135, angular velocity calculator 136, and additional information acquirer 137, in FIG. 1-10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method based on an acceleration sensor and a geomagnetic sensor for determining an angular velocity of an object by an angular velocity calculating apparatus, comprising:

deriving a state variable from the acceleration sensor and the geomagnetic sensor and a variance of the state variable based on an error quaternion and converting a quaternion-based rotation matrix into an error quaternion-based rotation matrix;

calculating an observation matrix and an output matrix of a Kalman filter after redefining an output of the acceleration sensor and an output of the geomagnetic sensor using the error quaternion-based rotation matrix;

calculating a gain of the Kalman filter based on the transferred variance of the state variable and the observation matrix of the Kalman filter after transferring the state variable and the variance of the state variable through a discretized transfer matrix;

calculating a quaternion based on a calibrated state variable and an estimated quaternion after calibrating the state variable and the variance of the state variable through the gain of the Kalman filter;

calculating the angular velocity based on the quaternion; and determining or controlling orientation of the object based on the angular velocity.

2. The method of claim 1, wherein in the converting of the quaternion-based rotation matrix into the error quaternion-based rotation matrix, the error quaternion $[q_{ex}, q_{ey}, q_{ez}]'$ of the quaternion $q=[q_0, q_x, q_y, q_z]'$, which expresses a relative angle change between a reference coordinate system and a sensor coordinate system, is set to a state variable x.

3. The method of claim 2, wherein in the converting of the quaternion-based rotation matrix into the error quaternion-based rotation matrix, when a current state and a previous state have a statistic correlation in which only time delay $\tau$ is generated, the state variable x is expressed by an equation of $\dot{x}=Fx$, F is a transfer matrix expressed by $$F = -\frac{1}{\tau}\begin{bmatrix} 1 & 0 & 0 \\ 0 & 1 & 0 \\ 0 & 0 & 1 \end{bmatrix},$$

and $\tau$ is a time factor representing an associated degree between the states.

4. The method of claim 1, wherein in the converting of the quaternion-based rotation matrix into the error quaternion-based rotation matrix, a variance of the state variable is calculated by an equation of $\hat{P}(t)=E\{(x(t)-\hat{x}(t))(x(t)-\hat{x}(t))'\}$, where x is a state variable, $\hat{x}$ is an estimated state variable, and ' is a transpose matrix.

5. The method of claim 1, wherein in the converting of the quaternion-based rotation matrix into the error quaternion-based rotation matrix, the quaternion-based rotation matrix is converted into the error quaternion-based rotation matrix based on an equation of $C(q)=C(q_e)C(\hat{q})$, the quaternion-based rotation matrix is $$C(q) = \begin{bmatrix} 2q_0^2+2q_x^2-1 & 2q_xq_y+2q_0q_z & 2q_xq_z-2q_0q_y \\ 2q_xq_y-2q_0q_z & 2q_0^2+2q_y^2-1 & 2q_yq_z+2q_0q_x \\ 2q_xq_z+2q_0q_y & 2q_yq_z-2q_0q_x & 2q_0^2+2q_z^2-1 \end{bmatrix},$$

the error quaternion-based rotation matrix is $$C(q_e) \approx \begin{bmatrix} 1 & 2q_{ez} & -2q_{ey} \\ -2q_{ez} & 1 & 2q_{ex} \\ 2q_{ey} & -2q_{ex} & 1 \end{bmatrix} = I_{3\times 3} - 2q_e \times,$$

where $q_{ex}$, $q_{ey}$, and $q_{ez}$ are vector component factors of the error quaternion, $q_e x$ represents $$\begin{bmatrix} 0 & -q_{ez} & q_{ey} \\ q_{ez} & 0 & -q_{ex} \\ -q_{ey} & q_{ex} & 0 \end{bmatrix},$$

and $q_0$ is a factor corresponding to $$\cos\left(\frac{\theta}{2}\right)$$

scalar in the quaternion.

6. The method of claim 5, wherein in the converting of the quaternion-based rotation matrix into the error quaternion-based rotation matrix, when $q_{ex}$, $q_{ey}$, and $q_{ez}$ are minute amounts, the error quaternion-based rotation matrix expressed by $$C(q_e) = \begin{bmatrix} 1+2q_{ex}^2 & 2q_{ex}q_{ey}+2q_{ez} & 2q_{ex}q_{ez}-2q_{ey} \\ 2q_{ex}q_{ey}-2q_{ez} & 1+2q_{ey}^2 & 2q_{ey}q_{ez}+2q_{ex} \\ 2q_{ex}q_{ez}+2q_{ey} & 2q_{ey}q_{ez}-2q_{ex} & 1+2q_{ez}^2 \end{bmatrix},$$

which is simplified into $$C(q_e) \approx \begin{bmatrix} 1 & 2q_{ez} & -2q_{ey} \\ -2q_{ez} & 1 & 2q_{ex} \\ 2q_{ey} & -2q_{ex} & 1 \end{bmatrix} = I_{3\times 3} - 2q_e \times.$$

7. The method of claim 1, wherein in the calculating of the observation matrix and the output matrix of the Kalman filter, an output $Y_a$ of acceleration sensor and an output $Y_m$ of the geomagnetic sensor are redefined based on a correlation between the error quaternion $q_e$ expressed by $C(q)=C(q_e)C(\hat{q})=(I-2q_e x)C(\hat{q})$ and the quaternion-based rotation matrix $C(q)$, the acceleration sensor output $Y_a$ is $Y_a-C(\hat{q})\vec{G}=2C(\hat{q})\vec{G}q_e+B_a+V_a$, the output $Y_m$ of the geomagnetic sensor is $Y_m-C(\hat{q})\vec{M}=2C(\hat{q})\vec{M}q_e+V_m$, where $C(\hat{q})$ is an estimated quaternion-based rotation matrix, $I_{3\times 3}$ is a 3×3 unit matrix, $\vec{G}$ is a gravitational acceleration vector, $B_a$ is linear acceleration, $V_a$ is a noise of the acceleration sensor, $\vec{M}$ is an earth geomagnetic vector, and $V_m$ is a noise of the geomagnetic sensor.

8. The method of claim 7, wherein in the calculating of an observation matrix and an output matrix of the Kalman filter, based on the acceleration sensor output $Y_a$ and the output $Y_m$ of the geomagnetic sensor, an observation matrix of the Kalman filter of $$H = \begin{bmatrix} 2C(\hat{q})\vec{G}q_e \\ 2C(\hat{q})\vec{M}q_e \end{bmatrix}$$

is calculated and an output matrix of the Kalman filter of $$Z = \begin{bmatrix} Y_a - C(\hat{q})\vec{G} \\ Y_m - C(\hat{q})\vec{M} \end{bmatrix}$$

is calculated.

9. The method of claim 1, wherein in the calculating of the gain of the Kalman filter, the state variable x is transferred according to an equation of $\hat{x}_{k+1}=F_k\hat{x}_k$ and a variance p of the state variable is transferred according to an equation of $\hat{P}_{k+1}=F_k\hat{P}_kF'_k+Qd_k$, where $F_k$ is a discretized transfer matrix expressed by an equation of $F_k \approx I+F(kT)T+\frac{1}{2}F(kT)^2T^2$, $Qd_k$ is a discretized process noise variance of Q expressed by an equation of $Qd_k \approx QT+\frac{1}{2}F(kT)+\frac{1}{2}F(kT)'$, and T is a sampling time.

10. The method of claim 9, wherein in the calculating of the gain of the Kalman filter, the discretized transfer matrix expressed by an equation of $$F_k = e^{F*T} e^{-\frac{T}{\tau}} \begin{bmatrix} 1 & 0 & 0 \\ 0 & 1 & 0 \\ 0 & 0 & 1 \end{bmatrix}$$

is assumed to be a first-order linear formula to be simplified into $F_k \approx I + F(kT)T + \frac{1}{2}F(kT)^2 T^2$, where F is a transfer matrix expressed by $$F = -\frac{1}{\tau} \begin{bmatrix} 1 & 0 & 0 \\ 0 & 1 & 0 \\ 0 & 0 & 1 \end{bmatrix},$$

and τ is a time factor which represents an associated degree between states.

11. The method of claim 9, wherein in the calculating of the gain of the Kalman filter, the gain of the Kalman filter is calculated according to an equation of $K_k = P_k H'_k (H_k \hat{P}_k H'_k + R)^{-1}$, where R is a variance of a measurement sensor error and is expressed by an equation of $$R = \begin{bmatrix} R_a I_{3\times 3} & 0_{3\times 3} \\ 0_{3\times 3} & R_m I_{3\times 3} \end{bmatrix},$$

$I_{3\times 3}$ is a 3×3 unit matrix, $0_{3\times 3}$ is a 3×3 0 matrix, $R_a$ is a variance of the acceleration sensor, and $R_m$ is a variance of the geomagnetic sensor.

12. The method of claim 1, wherein in the calculating of the quaternion, the state variable is calibrated according to an equation of $x_k = \hat{x}_k + K_k(Z_k - H_k \hat{x}_k)$ and a variance of the state variable is calibrated according to an equation of $P_k = (I - K_k H_k) \hat{P}_k (I - K_k H_k)' + K_k R K'_k$, where $K_k$ is a gain of the Kalman filter, $Z_k$ is an output matrix of the Kalman filter, $H_k$ is the observation matrix of the Kalman filter, I is a 3×3 unit matrix, and R is a variance of a measurement sensor error.

13. The method of claim 12, wherein in the calculating of the quaternion, after setting the calibrated state variable to be the error quaternion, the quaternion is calculated according to an equation of $q_k = \hat{q}_k \otimes [1 \ q_{ex} \ q_{ey} \ q_{ez}]'_k$, where $\hat{q}_k$ is an estimated quaternion and $q_{ex}$, $q_{ey}$, and $q_{ez}$ are three-factor variables of the error quaternion.

14. The method of claim 1, wherein in the calculating of angular velocity based on the quaternion, after acquiring a differential expression expressed by an equation of $$\frac{dq(t)}{dt} = \frac{1}{2} W(t) q(t)$$

by differentiating the quaternion, the differential expression is arranged for every factor and then discretized to acquire an angular velocity calculating equation expressed by an equation of $$\begin{bmatrix} \omega_x^k \\ \omega_y^k \\ \omega_z^k \end{bmatrix} = 2 / T \begin{bmatrix} q_0^k - q_0^{k-1} \\ q_x^k - q_x^{k-1} \\ q_y^k - q_y^{k-1} \\ q_z^k - q_z^{k-1} \end{bmatrix} \begin{bmatrix} -q_x^k & q_0^k & q_z^k & q_y^k \\ -q_y^k & -q_z^k & q_0^k & q_x^k \\ -q_z^k & q_y^k & -q_x^k & q_0^k \end{bmatrix},$$

where W(t) is an angular velocity vector expressed by an equation of $W(t) = [0 \ \omega_x \ \omega_y \ \omega_z]'$, $q_0$, $q_x$, $q_y$, and $q_z$ are four factors which configure the quaternion, and T is a sampling time.

15. The method of claim 14, wherein in the calculating of angular velocity based on the quaternion, the differential expression is arranged for every factor to derive and arrange equations of $$\frac{dq_0}{dt} = -\frac{1}{2}(\omega_x q_x + \omega_y q_y + \omega_z q_z)'',$$

$$\frac{dq_x}{dt} = \frac{1}{2}(\omega_x q_0 + \omega_y q_z - \omega_z q_y)'',$$

$$\frac{dq_y}{dt} = \frac{1}{2}(\omega_y q_0 + \omega_z q_x - \omega_z q_z)'',$$

$$\frac{dq_z}{dt} = -\frac{1}{2}(\omega_z q_0 + \omega_x q_y - \omega_x q_z)$$

to generate an equation for calculating an angular velocity vector expressed by an equation of $$W(t) = 2 \frac{dq(t)}{dt} q(t)^{-1}$$

and then discretize the equation for calculating an angular velocity vector to acquire the angular velocity calculating equation, and $q^{-1}$ is expressed by an equation of $q^{-1} = [q_0 \ -q_x \ -q_y \ -q_z]'$.

16. The method of claim 1, further comprising:
calculating an Euler angle by rotating the Euler angle in the order of a z axis, a y axis, and an x axis in the quaternion,
wherein the Euler angle is calculated based on at least one equation of Roll=$\tan^{-1}(2(q_0 q_x + q_y q_z), 1 - 2(q_x^2 + q_y^2))$, Pitch=$\sin^{-1}(2(q_0 q_y - q_z q_x))$, and Yaw=$\tan^{-1}(2(q_0 q_z + q_x q_y), 1 - 2(q_y^2 + q_z^2))$, and $q_0$, $q_x$, $q_y$, and $q_z$ are four factors which configure the quaternion.

17. The method of claim 1, further comprising:
calculating an Euler rotational axis and angle based on the quaternion,
wherein the Euler rotational axis is calculated according to an equation of $$\hat{e} = \frac{\vec{q}}{\|\vec{q}\|},$$

the angle of the Euler rotational axis is calculated according to an equation of $\theta_e = 2 \cos^{-1}(q_0)$, where $\vec{q}$ is a vector of a quaternion represented by $\vec{q} = q_x i + q_y j + q_z k$, i, j, and k are unit vectors of individual axes, and $\|\vec{q}\|$ is an absolute value of $\vec{q}$.

18. The method of claim 1, further comprising:
calculating linear acceleration of an object which is in motion based on the quaternion,
wherein the linear acceleration is calculated according to an equation of $B_a = -Y_a + C(q)\vec{G}$, where $Y_a$ is an acceleration sensor output, C(q) is a quaternion, and $\vec{G}$ is a gravitational acceleration vector.

19. An angular velocity calculating apparatus based on an acceleration sensor and a geomagnetic sensor for determining an angular velocity of an object, comprising:
   an error quaternion setting device configured to set an error quaternion;
   an estimating device configured to derive a state variable from the acceleration sensor and the geomagnetic sensor and a variance of the state variable based on the error quaternion, and convert a quaternion-based rotation matrix into an error quaternion-based rotation matrix;
   a filter configuring device configured to redefine an acceleration sensor output and an output of the geomagnetic sensor using the error quaternion-based rotation matrix to calculate an observation matrix and an output matrix of a Kalman filter, and transfer the state variable and the variance of the state variable through a discretized transfer matrix to calculate a gain of the Kalman filter;
   a calibrating device configured to calibrate the state variable and the variance of the state variable through the gain of the Kalman filter;
   a quaternion calculating device configured to calculate a quaternion based on the calibrated state variable and the estimated quaternion; and
   an angular velocity calculator configured to calculate the angular velocity based on the quaternion,
   wherein the angular velocity calculating apparatus determines or controls orientation of the object based on the angular velocity.

20. The angular velocity calculating apparatus of claim 19, wherein the estimating device is configured to set an error quaternion $[q_{ex}, q_{ey}, q_{ez}]'$ of a quaternion $q=[q_0, q_x, q_y, q_z]'$ which expresses a relative angle change between a reference coordinate system and a sensor coordinate system to a state variable (x), when a current state and a previous state have a statistic correlation in which only time delay $\tau$ is generated, the state variable x is expressed by an equation of $\dot{x}=Fx$, where F is a transfer matrix expressed by $$F = -\frac{1}{\tau}\begin{bmatrix} 1 & 0 & 0 \\ 0 & 1 & 0 \\ 0 & 0 & 1 \end{bmatrix},$$

and $\tau$ is a time factor representing an associated degree between the states.

21. The angular velocity calculating apparatus of claim 19, wherein the estimating device is configured to convert the quaternion-based rotation matrix into the error quaternion-based rotation matrix based on an equation of $C(q)=C(q_e)C(\hat{q})$, the quaternion-based rotation matrix is $$C(q) = \begin{bmatrix} 2q_0^2 + 2q_x^2 - 1 & 2q_xq_y + 2q_0q_z & 2q_xq_z - 2q_0q_y \\ 2q_xq_y - 2q_0q_z & 2q_0^2 + 2q_y^2 - 1 & 2q_yq_z + 2q_0q_x \\ 2q_xq_z + 2q_0q_y & 2q_yq_z - 2q_0q_x & 2q_0^2 + 2q_z^2 - 1 \end{bmatrix},$$

and the error quaternion-based rotation matrix is $$C(q_e) \approx \begin{bmatrix} 1 & 2q_{ez} & -2q_{ey} \\ -2q_{ez} & 1 & 2q_{ex} \\ 2q_{ey} & -2q_{ex} & 1 \end{bmatrix} = I_{3\times 3} - 2q_e \times,$$

where $q_{ex}$, $q_{ey}$, and $q_{ez}$ are vector component factors of the error quaternion, $q_e x$ represents $$\begin{bmatrix} 0 & -q_{ez} & q_{ey} \\ q_{ez} & 0 & -q_{ex} \\ -q_{ey} & q_{ex} & 0 \end{bmatrix},$$

and $q_0$ is a factor corresponding to $$\cos\left(\frac{\theta}{2}\right)$$

scalar in the quaternion.

22. The angular velocity calculating apparatus of claim 19, wherein the filter configuring device is configured to redefine an output $Y_a$ of the acceleration sensor and an output $Y_m$ of the geomagnetic sensor based on a correlation between the error quaternion $q_e$ expressed by $C(q)=C(q_e)C(\hat{q})=(I-2q_ex)C(\hat{q})$ and the quaternion-based rotation matrix $C(q)$, the redefined acceleration sensor output $Y_a$ is $Y_a - C(\hat{q})\vec{G} = 2C(\hat{q})\vec{G}q_e + B_a + V_a$, the redefined output $Y_m$ of the geomagnetic sensor is $Y_m - C(\hat{q})\vec{M} = 2C(\hat{q})\vec{M}q_e + V_m$, where $C(\hat{q})$ is an estimated quaternion-based rotation matrix, $I_{3\times 3}$ is a 3×3 unit matrix, $\vec{G}$ is a gravitational acceleration vector, $B_a$ is linear acceleration, $V_a$ is a noise of the acceleration sensor, $\vec{M}$ is an earth geomagnetic vector, and $V_m$ is a noise of the geomagnetic sensor.

23. The angular velocity calculating apparatus of claim 22, wherein the filter configuring device is configured to calculate an observation matrix of the Kalman filter of $$H = \begin{bmatrix} 2C(\hat{q})\vec{G}q_e \\ 2C(\hat{q})\vec{M}q_e \end{bmatrix}$$

and calculate an output matrix of the Kalman filter of $$Z = \begin{bmatrix} Y_a - C(\hat{q})\vec{G} \\ Y_m - C(\hat{q})\vec{M} \end{bmatrix},$$

based on the output $Y_a$ of the acceleration sensor and the output $Y_m$ of the geomagnetic sensor.

24. The angular velocity calculating apparatus of claim 19, wherein the filter configuring device is configured to transfer the state variable (x) according to an equation of $\hat{x}_{k+1} = F_k \hat{x}_k$, transfer a variance p of the state variable according to an equation of $\hat{P}_{k+1} = F_k \hat{P}_k F'_k + Qd_k$, and then calculate a gain of the Kalman filter according to an equation of $K_k = P_k H'_k (H_k \hat{P}_k H'_k + R)^{-1}$, where $F_k$ is a discretized transfer matrix represented by an equation of $F_k \approx I + F(kT)T + \frac{1}{2}F(kT)^2 T^2$, $Qd_k$ is a discretized process noise variance of Q represented by an equation of $Qd_k \approx QT + \frac{1}{2}F(kT) + \frac{1}{2}F(kT)'$, T is a sampling time, $H_k$ is an observation matrix of the Kalman filter, and R is a variance of a measurement sensor error.

25. The angular velocity calculating apparatus of claim 19, wherein the calibrating device is configured to calibrate the state variable according to an equation of $x_k = \hat{x}_k + K_k(Z_k -$ $H_k\hat{x}_k$) and calibrate a variance of the state variable according to an equation of $P_k=(I-K_kH_k)\hat{P}_k(I-K_kH_k)'+K_kRK'_k$, where $K_k$ is a gain of the Kalman filter, $Z_k$ is an output matrix of the Kalman filter, $H_k$ is an observation matrix of the Kalman filter, I is a 3×3 unit matrix, and R is a variance of a measurement sensor error.

26. The angular velocity calculating apparatus of claim 19, wherein the quaternion calculating device is configured to calculate the quaternion according to an equation of $q_k=\hat{q}_k \otimes [1\ q_{ex}\ q_{ey}\ q_{ez}]'_k$ after setting the calibrated state variable to be an error quaternion, where $\hat{q}_k$ is an estimated quaternion and $q_{ex}$, $q_{ey}$, and $q_{ez}$ are three-factor variables of the error quaternion.

27. The angular velocity calculating apparatus of claim 19, wherein the angular velocity calculator is configured to arrange a differential expression according to factors and then discretizes to acquire an angular velocity calculating equation represented by an equation of $$\begin{bmatrix} \omega_x^k \\ \omega_y^k \\ \omega_z^k \end{bmatrix} = 2/T \begin{bmatrix} q_0^k - q_0^{k-1} \\ q_x^k - q_x^{k-1} \\ q_y^k - q_y^{k-1} \\ q_z^k - q_z^{k-1} \end{bmatrix} \begin{bmatrix} -q_x^k & q_0^k & q_z^k & q_y^k \\ -q_y^k & -q_z^k & q_0^k & q_x^k \\ -q_z^k & q_y^k & -q_x^k & q_0^k \end{bmatrix}$$

after acquiring the differential expression expressed by an equation of $$\frac{dq(t)}{dt} = \frac{1}{2}W(t)q(t)$$

by differentiating the quaternion, where W(t) is an angular velocity vector represented by an equation of $W(t)=[0\ \omega_x\ \omega_y\ \omega_z]'$, $q_0$, $q_x$, $q_y$, and $q_z$ are four factors which configure the quaternion, and T is a sampling time.

* * * * *